(12) United States Patent
Kizu et al.

(10) Patent No.: US 10,038,669 B2
(45) Date of Patent: Jul. 31, 2018

(54) PATH CONTROL SYSTEM, CONTROL DEVICE, AND PATH CONTROL METHOD

(71) Applicants: Yoshiya Kizu, Tokyo (JP); Kenichi Kashima, Tokyo (JP)

(72) Inventors: Yoshiya Kizu, Tokyo (JP); Kenichi Kashima, Tokyo (JP)

(73) Assignee: NEC Corporation, Tokyo (JP)

( * ) Notice: Subject to any disclaimer, the term of this patent is extended or adjusted under 35 U.S.C. 154(b) by 17 days.

(21) Appl. No.: 14/380,693

(22) PCT Filed: Feb. 1, 2013

(86) PCT No.: PCT/JP2013/000574
§ 371 (c)(1),
(2) Date: Aug. 22, 2014

(87) PCT Pub. No.: WO2013/128798
PCT Pub. Date: Sep. 6, 2013

(65) Prior Publication Data
US 2015/0047010 A1    Feb. 12, 2015

(30) Foreign Application Priority Data
Mar. 2, 2012 (JP) ................................. 2012-047051

(51) Int. Cl.
*G06F 9/00* (2006.01)
*H04L 29/06* (2006.01)
(Continued)

(52) U.S. Cl.
CPC .......... *H04L 63/0227* (2013.01); *H04L 45/64* (2013.01); *H04L 47/122* (2013.01);
(Continued)

(58) Field of Classification Search
CPC . H04L 63/0263; H04L 63/0227; H04L 63/02; H04L 12/58
See application file for complete search history.

(56) References Cited

U.S. PATENT DOCUMENTS 7,522,627 B2 * 4/2009 Lam ........................ H04L 45/04
                                                                370/427
8,019,868 B2 * 9/2011 Rao ...................... H04L 12/2856
                                                                709/224
(Continued)

FOREIGN PATENT DOCUMENTS

JP    11-205388 A    7/1999
JP    2003-174483 A    6/2003
(Continued)

OTHER PUBLICATIONS

International Search Report (ISR) (PCT Form PCT/ISA/210), in PCT/JP2013/000574, dated Mar. 26, 2013.
(Continued)

*Primary Examiner* — Ali Abyaneh
(74) *Attorney, Agent, or Firm* — McGinn IP Law Group, PLLC

(57) ABSTRACT

To provide a path control system, a control device and a path control method that can achieve reduction of the load on a gateway device, there are included a communication device, a communication device, a security device that provides a security feature to data transmitted and received between the communication device and the communication device, and a path control device that selects one of a first path through the security device and a second path not through the security device as a communication path of the data based on a path information table where an attribute of the data and a communication path between the communication device and the communication device are associated.

15 Claims, 29 Drawing Sheets

(51) Int. Cl.
*H04L 29/08* (2006.01)
*H04L 12/803* (2013.01)
*H04L 12/715* (2013.01)
*H04L 12/729* (2013.01)

(52) U.S. Cl.
CPC ........ *H04L 63/0209* (2013.01); *H04L 67/322* (2013.01); *H04L 69/14* (2013.01); *H04L 45/125* (2013.01); *H04L 63/164* (2013.01)

(56) References Cited

U.S. PATENT DOCUMENTS

| | | | |
|---|---|---|---|
| 2005/0198200 A1* | 9/2005 | Subramanian | H04L 41/50 709/218 |
| 2006/0136722 A1 | 6/2006 | Ogura et al. | |
| 2007/0157307 A1 | 7/2007 | Katoh et al. | |
| 2009/0073895 A1* | 3/2009 | Morgan | H04L 63/0227 370/255 |
| 2010/0232438 A1* | 9/2010 | Bajpai | H04L 69/16 370/400 |
| 2010/0251329 A1* | 9/2010 | Wei | H04L 63/1408 726/1 |
| 2011/0211443 A1* | 9/2011 | Leong | H04L 63/02 370/218 |
| 2012/0079478 A1* | 3/2012 | Galles | H04L 47/2441 718/1 |
| 2012/0259988 A1* | 10/2012 | Erringer | H04L 67/104 709/228 |

FOREIGN PATENT DOCUMENTS

| | | |
|---|---|---|
| JP | 2005-27218 A | 1/2005 |
| JP | 2006-180280 A | 7/2006 |
| JP | 2007-184724 A | 7/2007 |
| JP | 2008-219150 A | 9/2008 |
| WO | WO 2011-049135 | 4/2011 |
| WO | WO 2011/083668 A1 | 7/2011 |

OTHER PUBLICATIONS

Japanese Office Action dated Nov. 10, 2015 with an English translation thereof.

* cited by examiner

Fig. 7

| SYSTEM ID | DEVICE TYPE | DEVICE ID | Link | TYPE | VALUE | THRESHOLD | UPDATE DATE AND TIME | WEIGHT (0~1) |
|---|---|---|---|---|---|---|---|---|
| SS1 | FW | 1 | — | CPU UTILIZATION | 10% | 80% | T1 | 0.1 |
| SS1 | FW | 2 | — | CPU UTILIZATION | 30% | 80% | T1 | 0.1 |
| SS1 | FW | 3 | — | CPU UTILIZATION | 20% | 80% | T1 | 0.1 |
| SS1 | FW | 1 | — | NUMBER OF SESSION TABLE ENTRIES | 2000 | 65000 | T1 | 0.2 |
| SS1 | FW | 2 | — | NUMBER OF SESSION TABLE ENTRIES | 3000 | 65000 | T1 | 0.2 |
| SS1 | FW | 3 | — | NUMBER OF SESSION TABLE ENTRIES | 8000 | 65000 | T1 | 0.2 |
| SS1 | SW | 1 | — | NUMBER OF FLOW ENTRIES | 12000 | 65000 | T1 | 0.2 |
| OSW | SW | 1 | — | NUMBER OF FLOW ENTRIES | 30000 | 65000 | T1 | 0.2 |
| OSW | SW | 1 | p2-p1 | IP PACKET LOSS | 0.1% | 3% | T1 | 0.7 |
| OSW | SW | 1 | p2-p1 | IP PACKET DELAY (AVERAGE) | 100ms | 500ms | T1 | 0.1 |
| ... | ... | ... | ... | ... | ... | ... | ... | ... |
| ISW | SW | 1 | — | NUMBER OF FLOW ENTRIES | 80000 | 200000 | T1 | 0.2 |
| ISW | SW | 1 | p9-p5 | IP PACKET LOSS | 0.01% | 3% | T1 | 0.7 |
| ISW | SW | 1 | p9-p5 | IP PACKET DELAY (AVERAGE) | 50ms | 500ms | T1 | 0.1 |

Fig. 8

| SYSTEM AS ENTRANCE ||||| SYSTEM AS EXIT ||||| PATH COST | LOAD INFORMATION |
| SYSTEM ID | DEVICE TYPE | DEVICE ID | In | Out | SYSTEM ID | DEVICE TYPE | DEVICE ID | In | Out | | |
|---|---|---|---|---|---|---|---|---|---|---|---|
| OSW | SW | 1 | p1 | p2 | SS1 | FW | 1 | p1 | p2 | 20 | 0.191 |
| OSW | SW | 1 | p1 | p2 | SS1 | FW | 2 | p1 | p3 | 20 | 0.219 |
| OSW | SW | 1 | p1 | p2 | SS1 | FW | 3 | p1 | p4 | 20 | 0.222 |
| SS1 | FW | 1 | p5 | p9 | ISW | SW | 1 | p5 | p4 | 20 | 0.4 |
| SS1 | FW | 2 | p6 | p9 | ISW | SW | 1 | p5 | p4 | 20 | 0.4 |
| SS1 | FW | 3 | p7 | p9 | ISW | SW | 1 | p5 | p4 | 20 | 0.4 |
| OSW | SW | 1 | p1 | p3 | ISW | SW | 1 | p6 | p4 | 20 | 0.4 |
| ISW | SW | 1 | p4 | p6 | OSW | SW | 1 | p3 | p1 | 10 | 0.157 |
| ISW | SW | 1 | p4 | p5 | SS1 | FW | 1 | p9 | p5 | 20 | 0.304 |
| ISW | SW | 1 | p4 | p5 | SS1 | FW | 2 | p9 | p6 | 20 | 0.304 |
| ISW | SW | 1 | p4 | p5 | SS1 | FW | 3 | p9 | p7 | 20 | 0.428 |
| ... | ... | ... | ... | ... | ... | ... | ... | ... | ... | ... | ... |
| SS1 | FW | 1 | p2 | p1 | OSW | SW | 1 | p2 | p1 | 20 | 0.4 |
| SS1 | FW | 2 | p3 | p1 | OSW | SW | 1 | p2 | p1 | 20 | 0.4 |
| SS1 | FW | 3 | p4 | p1 | OSW | SW | 1 | p2 | p1 | 20 | 0.4 |

Fig. 9

| ID | Src IP | Src Port | Dst IP | Dst Port | Protocol | OUTWARD PATH DEVICE TYPE | RETURN PATH DEVICE TYPE | Idle Timeout (s) | Cache Timeout (s) | Session Update Flag |
|---|---|---|---|---|---|---|---|---|---|---|
| 1 | 10.0.0.0/24 | Any | 192.168.1.2 | 25 | tcp(6) | OSW:SW:1-FW, FW-AV, AV-ISW:SW:1 | ISW:SW:1-FW, FW-OSW:SW:1 | 30 | 120 | 0 |
| 2 | 10.0.0.0/24 | Any | 192.168.1.3 | 21 | tcp(6) | OSW:SW:1-FW, FW-ISW:SW:1 | ISW:SW:1-FW, FW-OSW:SW:1 | 30 | 120 | 1 |
| 3 | 10.0.0.0/24 | Any | 192.168.1.3 | 80 | tcp(6) | OSW:SW:1-FW, FW-ISW:SW:1 | ISW:SW:1-FW, FW-OSW:SW:1 | 30 | 60 | 0 |
| 4 | 10.0.0.0/24 | Any | 192.168.1.4 | 53 | udp(17) | OSW:SW:1-FW, FW-ISW:SW:1 | ISW:SW:-OSW:SW:1 | 30 | 60 | 0 |
| ... | ... | ... | ... | ... | ... | ... | ... | ... | ... | ... |
| n-1 | 10.0.0.0/24 | Any | 192.168.1.20 | 9000 | tcp(6) | OSW:SW:1-FW, FW-ISW:SW:1 | ISW:SW:1-FW, FW-OSW:SW:1 | 30 | 60 | 0 |
| n | Any | Any | Any | Any | Any | OSW:SW:1-FW, FW-ISW:SW:1 | ISW:SW:1-FW, FW-OSW:SW:1 | 30 | 60 | 0 |

Fig. 10

| Src IP | Src Port | Dst IP | Dst Port | Protocol | OUTWARD PATH | RETURN PATH | priority | Session Timeout |
|---|---|---|---|---|---|---|---|---|
| 10.0.0.1 | 30029 | 192.168.1.3 | 80 | tcp(6) | OSW:SW:1-SS1:FW:2, SS1:FW:2-ISW:SW:1 | ISW:SW:1-OSW:SW:1 | 32768 | 2010/12/1 00:00:18 |
| 10.0.0.5 | 30329 | 192.168.1.4 | 53 | udp(17) | OSW:SW:1-SS1:FW:1, SS1:FW:1-ISW:SW:1 | ISW:SW:1-OSW:SW:1 | 32768 | 2010/12/1 00:01:10 |
| ... | ... | ... | ... | ... | ... | ... | ... | ... |
| 10.0.0.20 | 32903 | 192.168.1.20 | 9000 | tcp(6) | OSW:SW:1-SS1:FW:2, SS1:FW:2-ISW:SW:1 | ISW:SW:1-SS1:FW:2, SS1:FW:2-OSW:SW:1 | 32768 | 2010/12/1 00:02:20 |

FLOW INFORMATION MANAGEMENT TABLE IN OSW

| Match | | | | | | | | Action |
|---|---|---|---|---|---|---|---|---|
| Ingress Port | Src HWaddr | Dst HWaddr | Src IP | Src Port | Dst IP | Dst Port | Protocol | dl_type | Egress Port |
| p1 | CL1 | SV1 | 10.3.0.1 | 8032 | 192.168.1.4 | 53 | udp(17) | 0x0800 | p2 |
| p3 | SV1 | CL1 | 192.168.1.4 | 53 | 10.3.0.1 | 8032 | udp(17) | 0x0800 | p1 |

Fig. 12

FLOW INFORMATION MANAGEMENT TABLE IN SS1

| Match | | | | | | | | Action |
|---|---|---|---|---|---|---|---|---|
| Ingress Port | Src HWaddr | Dst HWaddr | Src IP | Src Port | Dst IP | Dst Port | Protocol | dl_type | Egress Port |
| p1 | CL1 | SV1 | 10.3.0.1 | 8032 | 192.168.1.4 | 53 | udp(17) | 0x0800 | p2 |
| p5 | CL1 | SV1 | 10.3.0.1 | 8032 | 192.168.1.4 | 53 | udp(17) | 0x0800 | p9 |

Fig. 13

FLOW INFORMATION MANAGEMENT TABLE IN ISW

| Match | | | | | | | | Action |
|---|---|---|---|---|---|---|---|---|
| Ingress Port | Src HWAddr | Dst HWaddr | Src IP | Src Port | Dst IP | Dst Port | Protocol | dl_type | Egress Port |
| p5 | CL1 | SV1 | 10.3.0.1 | 8032 | 192.168.1.4 | 53 | udp(17) | 0x0800 | p4 |
| p4 | SV1 | CL1 | 192.168.1.4 | 53 | 10.3.0.1 | 8032 | udp(17) | 0x0800 | p6 |

Fig. 14

| Src IP | Src Port | Dst IP | Dst Port | Protocol | Status | Action |
|---|---|---|---|---|---|---|
| 10.0.0.1 | any | 192.168.1.3 | 80 | tcp(6) | ESTABLISHED | "OUTWARD PATH" : "-FW", "RETURN PATH" : "-FW", "priority" : -1 |
| 192.168.1.3 | 20 | 10.0.0.0/24 | any | tcp(6) | ESTABLISHED | "OUTWARD PATH" : "-FW", "RETURN PATH" : "-FW", "priority" : -1 |
| 192.168.1.3 | any | 10.0.0.0/24 | 2000-2050 | tcp(6) | ESTABLISHED | "OUTWARD PATH" : "-FW", "RETURN PATH" : "-FW", "priority" : -1 |
| ... | ... | ... | ... | ... | ... | ... |
| 192.168.1.20 | any | 10.0.0.20 | 9000 | tcp(6) | ESTABLISHED | "OUTWARD PATH" : "-FW", "RETURN PATH" : "-FW", "priority" : -1 |

Fig. 19

[PATH CHANGE REQUEST]

{ "Request" : "replace", "retry" : 0, "retry interval" : 0, "delay" : 0, "Parameter" :
[{ "Src IP" : "10.0.0.1", "Src Port" : "30029", "Dst IP" : "192.168.1.3", "Dst Port" : "80",
"Protocol" : "tcp(6)", "OUTWARD PATH" : "-FW", "RETURN PATH" : "-FW", "priority" : -1},
{ "Src IP" : "192.168.1.3", "Src Port" : "20", "Dst IP" : "10.0.0.2", "Dst Port" : "any",
"Protocol" : "tcp(6)", "OUTWARD PATH" : "-FW", "RETURN PATH" : "-FW", "priority" : -1}, " " ,
{ "Src IP" : "192.168.1.20", "Src Port" : "3093", "Dst IP" : "10.0.0.20", "Dst Port" : "9000",
"Protocol" : "tcp(6)", "OUTWARD PATH" : "-FW", "RETURN PATH" : "-FW", "priority" : -1}]}

[PATH CHANGE RESULT]

[{ "Result" : "OK(0)", "Message" : "" },
[{ "Result" : "NG(1)", "Message" : "Error: NO MATCHING RULE" }, " " ,
{ "Result" : "OK(0)", "Message" : "ALREADY CHANGED" }]]

Fig. 20

| ID | Src IP | Src Port | Dst IP | Dst Port | Protocol | OUTWARD PATH | RETURN PATH | priority | Session Timeout |
|---|---|---|---|---|---|---|---|---|---|
| 1 | 10.0.0.1 | 33229 | 192.168.1.3 | 25 | tcp(6) | OSW:SW:1-SS1:FW:2, SS1:FW:2-ISW:SW:1 | ISW:SW:1-SS1:FW:2, SS1:FW:2-OSW:SW:1 | 32768 | 2010/12/1 10:05:00 |
| 2 | 10.0.0.3 | 20302 | 192.168.1.4 | 8000 | tcp(6) | OSW:SW:1-SS1:FW:2, SS1:FW:2-ISW:SW:1 | ISW:SW:1-SS1:FW:2, SS1:FW:2-OSW:SW:1 | 32768 | 2010/12/1 10:00:15 |
| ... | ... | ... | ... | ... | ... | ... | ... | ... | ... |
| n | 10.0.0.1 | 30029 | 192.168.1.3 | 80 | tcp(6) | OSW:SW:1-SS1:FW:1, SS1:FW:1-ISW:SW:1 | ISW:SW:1-SS1:FW:1, SS1:FW:1-OSW:SW:1 | 32768 | 2010/12/1 10:15:05 |

Fig. 21

| ID | Src IP | Src Port | Dst IP | Dst Port | Protocol | OUTWARD PATH | RETURN PATH | priority | Session Timeout |
|---|---|---|---|---|---|---|---|---|---|
| 1 | 10.0.0.1 | 33229 | 192.168.1.3 | 25 | tcp(6) | OSW:SW:1-<br>SS1:FW:2,<br>SS1:FW:2-<br>ISW:SW:1 | ISW:SW:1-<br>SS1:FW:2,<br>SS1:FW:2-<br>OSW:SW:1 | 32768 | 2010/12/1<br>10:05:00 |
| 2 | 10.0.0.3 | 20302 | 192.168.1.4 | 8000 | tcp(6) | OSW:SW:1-<br>SS1:FW:2,<br>SS1:FW:2-<br>ISW:SW:1 | ISW:SW:1-<br>SS1:FW:2,<br>SS1:FW:2-<br>OSW:SW:1 | 32768 | 2010/12/1<br>10:00:15 |
| ... | ... | ... | ... | ... | ... | ... | ... | ... | ... |
| n | 10.0.0.1 | 30029 | 192.168.1.3 | 80 | tcp(6) | OSW:SW:1-<br>ISW:SW:1 | ISW:SW:1-<br>OSW:SW:1 | 32767 | 2010/12/1<br>10:15:05 |

UPDATED PART

Fig. 22

EXAMPLE OF SIGNATURE OF IPS DEVICE :
FOR CLIENT'S ACQUISITION OF FILE FROM SERVER, BYPASS IPS DEVICE. NO SUBSEQUENT CHECK bypass_ips tcp 10.0.0.0/8 any -> 192.168.1.0/24 80 (msg: "send a request to bypass IPS devices"; flow: to_server,
established; content: "GET"; nocase; id:3000; rev:1;)
alert tcp 10.0.0.0/8 any -> 192.168.1.0/24 80 (msg: "WEB-CGI /cgi-bin/ access"; flow: to_server, established;
uricontent:"/cgi-bin/"; content:"/cgi-bin/ HTTP"; nocase; id:3001; rev:8;)
~OMISSION~
alert tcp 10.0.0.0/8 any -> 192.168.1.0/24 80 (msg: "WEB-CGI perl command attempt"; flow: to_server, established;
uricontent:"/perl?"; nocase; id:5001; rev:8;)

Fig. 26

[PATH CHANGE REQUEST]

[ "Request" : "replace" , "Retry" : 3, "Retry Interval" : 100, "Delay" : 1000, "Parameter" :
[{ "Src IP" : "10.0.0.1" , "Src Port" : "31113" , "Dst IP" : "192.168.1.3 ", "Dst Port" : "80" ,
 "Protocol" : "tcp(6)" , OUTWARD PATH" : "-IPS" , "RETURN PATH" , "-IPS" , "Priority" : -1}]}

[PATH CHANGE RESULT]

[{ "Result" : "OK(0)" , "Message" : "" }]

| ID | Src IP | Src Port | Dst IP | Dst Port | Protocol | OUTWARD PATH | RETURN PATH | priority | Session Timeout |
|---|---|---|---|---|---|---|---|---|---|
| 1 | 10.0.0.1 | 33229 | 192.168.1.3 | 25 | tcp(6) | OSW:SW:1-SS1:FW:2, SS1:FW:2-ISW:SW:1 | ISW:SW:1-SS1:FW:2, SS1:FW:2-OSW:SW:1 | 32768 | 2010/12/2 10:05:00 |
| 2 | 10.0.0.3 | 20302 | 192.168.1.4 | 8000 | tcp(6) | OSW:SW:1-SS1:FW:2, SS1:FW:2-ISW:SW:1 | ISW:SW:1-SS1:FW:2, SS1:FW:2-OSW:SW:1 | 32768 | 2010/12/2 10:00:15 |
| ... | ... | ... | ... | ... | ... | ... | ... | ... | ... |
| n | 10.0.0.1 | 31113 | 192.168.1.3 | 80 | tcp(6) | OSW:SW:1-SS1:FW:1,SS1:FW:1-SS2:IPS:1, SS2:IPS:1-ISW:SW:1 | ISW:SW:1-SS2:IPS:1, SS2:IPS:1-SS1:FW:1, SS1:FW:1-OSW:SW:1 | 32768 | 2010/12/2 10:15:05 |

Fig. 28

| ID | Src IP | Src Port | Dst IP | Dst Port | Protocol | OUTWARD PATH | RETURN PATH | priority | Session Timeout |
|---|---|---|---|---|---|---|---|---|---|
| 1 | 10.0.0.1 | 33229 | 192.168.1.3 | 25 | tcp(6) | OSW:SW:1-SS1:FW:2, SS1:FW:2-ISW:SW:1 | ISW:SW:1-SS1:FW:2, SS1:FW:2-OSW:SW:1 | 32768 | 2010/12/2 10:05:00 |
| 2 | 10.0.0.3 | 20302 | 192.168.1.4 | 8000 | tcp(6) | OSW:SW:1-SS1:FW:2, SS1:FW:2-ISW:SW:1 | ISW:SW:1-SS1:FW:2, SS1:FW:2-OSW:SW:1 | 32768 | 2010/12/2 10:00:15 |
| ... | ... | ... | ... | ... | ... | ... | ... | ... | ... |
| n | 10.0.0.1 | 31113 | 192.168.1.3 | 80 | tcp(6) | OSW:SW:1-ISW:SW:1 | ISW:SW:1-OSW:SW:1 | 32767 | 2010/12/2 10:15:05 |

← UPDATED PART

Fig. 29

PATH CONTROL SYSTEM, CONTROL DEVICE, AND PATH CONTROL METHOD

TECHNICAL FIELD

The present invention relates to a control system and, particularly, to a path control system where a communication path includes a security system.

BACKGROUND ART

In order to reduce the installation cost and the operation cost of a security product in a communication network, many features, such as a firewall feature, an antivirus feature, an URL (Uniform Resource Locator) filtering feature and an IPS (Intrusion Prevention System) feature, are increasingly incorporated into one gateway device. However, as a result of incorporating many features into a gateway device, the processing load on the gateway device increases, which causes the gateway device to behave as a bottleneck on the communication path.

In Patent Literature 1, a network configuration where a router packet path control device receives all packets having passed through a firewall once is disclosed. The router packet path control device transfers subsequent packets having the same features as the received packets directly to each network without through the firewall. This achieves reduction of the processing load on the firewall.

In Patent Literature 2, a technique that selects either one of a path that is through a security center or a communication path that connects directly to the other end of communication according to the other end of communication or an application corresponding to the communication to prevent an increase in the load on a server in the security center or the like is disclosed.

In Patent Literature 3, a technique that, when a mobile terminal performs communication by dynamically switching an available wireless system, does not use IPsec in the case where encryption is not required between the mobile terminal and a gateway device, and performs encryption using IPsec only in the case of using a wireless system requiring encryption is disclosed. This prevents an increase in the load on the gateway device.

CITATION LIST

Patent Literature

PTL1: Japanese Unexamined Patent Application Publication No. 2005-27218
PTL2: Japanese Unexamined Patent Application Publication No. 2006-180280
PTL3: Japanese Unexamined Patent Application Publication No. 2008-219150

SUMMARY OF INVENTION

Technical Problem

However, in the packet transfer method disclosed in Patent Literature 1, the router packet path control device receives all packets once and then transfers the received packets to each network. There is thus a problem that the load concentrates on the router packet path control device. In the communication path selection method disclosed in Patent Literature 2, path control is performed using a part of a communication header that is generally used for QoS setting. There is thus a problem that the header cannot be used for QoS setting. Further, in the IPsec application method disclosed in Patent Literature 3, communication data goes through the gateway device with the IPsec feature once. Further, the gateway device determines whether or not to apply IPsec to the data by referring to a routing table or the like, and when applying IPsec, the gateway device performs an IPsec setting process. There is thus a problem that the load concentrates on the gateway device.

The present invention has been accomplished to solve at least one of the above problems and an exemplary object of the present invention is thus to provide a path control system, a control device and a path control method that can achieve reduction of the load on a gateway device.

Solution to Problem

A path control system according to a first exemplary aspect of the present invention includes a first communication device, a second communication device, a security device that provides a security feature to data transmitted and received between the first communication device and the second communication device, and a path control means for selecting one of a first path through the security device and a second path not through the security device as a communication path of the data based on a path information table where an attribute of the data and a communication path between the first communication device and the second communication device are associated.

A control device according to a second exemplary aspect of the present invention includes a communication control unit that selects one of a first path through a security device that provides a security feature to data transmitted and received between a first communication device and a second communication device and a second path not through the security device as a communication path of the data based on a path information table where an attribute of the data transmitted and received between the first communication device and the second communication device and a communication path between the first communication device and the second communication device are associated.

A path control method according to a third exemplary aspect of the present invention includes selecting one of a first path through a security device that provides a security feature to data transmitted and received between a first communication device and a second communication device and a second path not through the security device as a communication path of the data based on a path information table where an attribute of the data transmitted and received between the first communication device and the second communication device and a communication path between the first communication device and the second communication device are associated.

Advantageous Effects of Invention

According to the above exemplary aspects of the invention described above, it is possible to provide a path control system, a control device and a path control method that can achieve reduction of the load on a gateway device.

BRIEF DESCRIPTION OF DRAWINGS

FIG. 7 is a diagram illustrating a load information management table according to the second exemplary embodiment.

FIG. 8 is a diagram illustrating a path information management table according to the second exemplary embodiment.

FIG. 9 is a diagram illustrating a control rule management table according to the second exemplary embodiment.

FIG. 10 is a diagram illustrating a session information management table according to the second exemplary embodiment.

FIG. 12 is a diagram illustrating a flow information management table in OSW according to the second exemplary embodiment.

FIG. 13 is a diagram illustrating a flow information management table in SS according to the second exemplary embodiment.

FIG. 14 is a diagram illustrating a flow information management table in ISW according to the second exemplary embodiment.

FIG. 19 is a diagram illustrating a communication path change information management table according to the second exemplary embodiment.

FIG. 20 is a diagram showing information transmitted and received between a communication path update unit and a flow controller according to the second exemplary embodiment.

FIG. 21 is a diagram illustrating a session information management table according to the second exemplary embodiment.

FIG. 22 is a diagram illustrating a session information management table according to the second exemplary embodiment.

FIG. 26 is a diagram illustrating a path selection rule according to the third exemplary embodiment.

FIG. 28 is a diagram illustrating a session information management table according to the third exemplary embodiment.

FIG. 29 is a diagram illustrating a session information management table according to the third exemplary embodiment.

DESCRIPTION OF EMBODIMENTS

First Exemplary Embodiment

Figure 1:
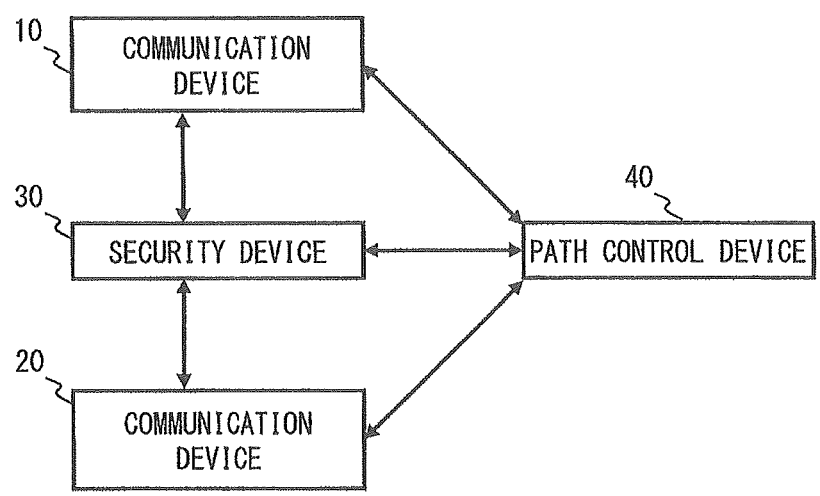
FIG. 1 is a diagram of a path control system according to a first exemplary embodiment.

Exemplary embodiments of the present invention are described hereinafter with reference to the drawings. First, a configuration example of a path control system according to a first exemplary embodiment of the invention is described with reference to FIG. 1. The path control system includes communication devices 10 and 20, a security device 30, and a path control device 40.

The communication devices 10 and 20 may be a router device, a switch device or the like, for example. The communication devices 10 and 20 receive data and transmit data based on a routing table, a switching table or the like.

The security device 30 provides security features to data transmitted and received between the communication device 10 and the communication device 20. The security features provided by the security device 30 are a firewall feature, an antivirus feature, an URL filtering feature, an IPS feature and the like, for example, and at least one of those features is provided. The security device 30 applies the security features to data transmitted from the communication device 10 or the communication device 20.

The path control device 40 selects a communication path for data based on a path information table where a communication path between the communication device 10 and the communication device 20 is specified according to an attribute of data. An attribute of data may be source identification information set to the data, protocol information and the like. The source identification information may be an IP address, a MAC address, a port number and the like. The protocol information may be information that identifies UDP, TCP or the like used for data transmission.

The communication path includes a path that goes through the security device 30 and a path that does not go through the security device 30 when data is transferred between the communication device 10 and the communication device 20. The path control device 40 selects either one of the path that goes through the security device 30 and the path that does not go through the security device 30 as a communication path for data based on the path information table. In the path information table, an attribute of data and path information for data transfer between the communication device 10 and the communication device 20 are managed in association with each other.

As described above, with use of the path control system according to the first exemplary embodiment of the invention, it is possible to determine whether or not to go through the security device 30 for each data. It is thereby possible to reduce the total amount of data that go through the security device 30 and reduce the processing load on the security device 30.

Second Exemplary Embodiment

Figure 2:
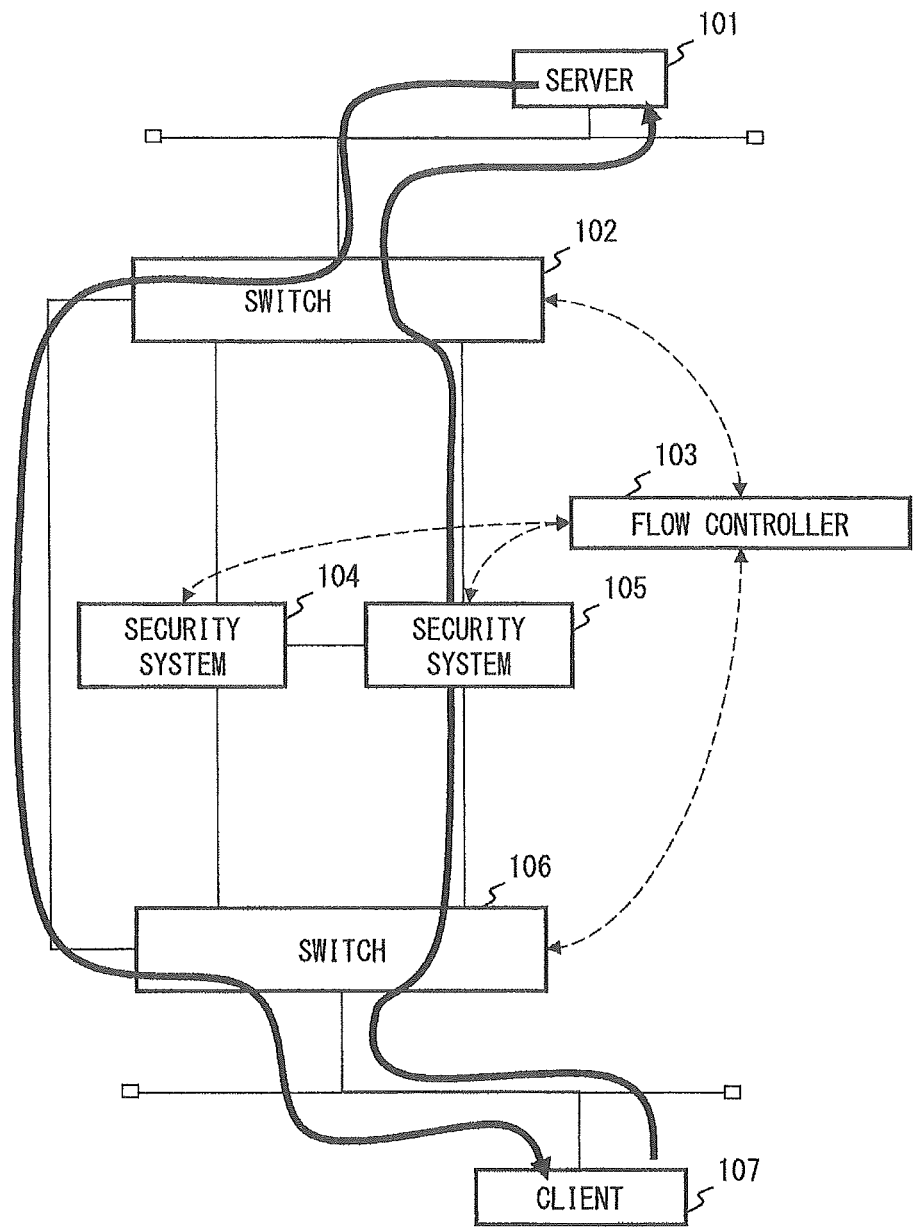
FIG. 2 is a schematic diagram of a network configuration according to a second exemplary embodiment.

The overview of a network configuration according to a second exemplary embodiment of the invention is described hereinafter with reference to FIG. 2. The network in FIG. 2 is composed of a server 101, switches 102 and 106, a flow controller 103, security systems 104 and 105, and a client 107.

The server 101 is a device on a communication network that provides a service in response to a request from the client 107. The switches 102 and 106 are devices that control a path of a packet flowing through the communication network, receiving an instruction from the flow controller 103.

The security system 104 and the security system 105 are placed between the server 101 and the client 107 and further between the switch 102 and the switch 106. The security systems 104 and 105 are systems that execute security control, such as discarding the communication, according to a preset rule by referring to a header or a payload of a packet flowing through each device.

Figure 3:
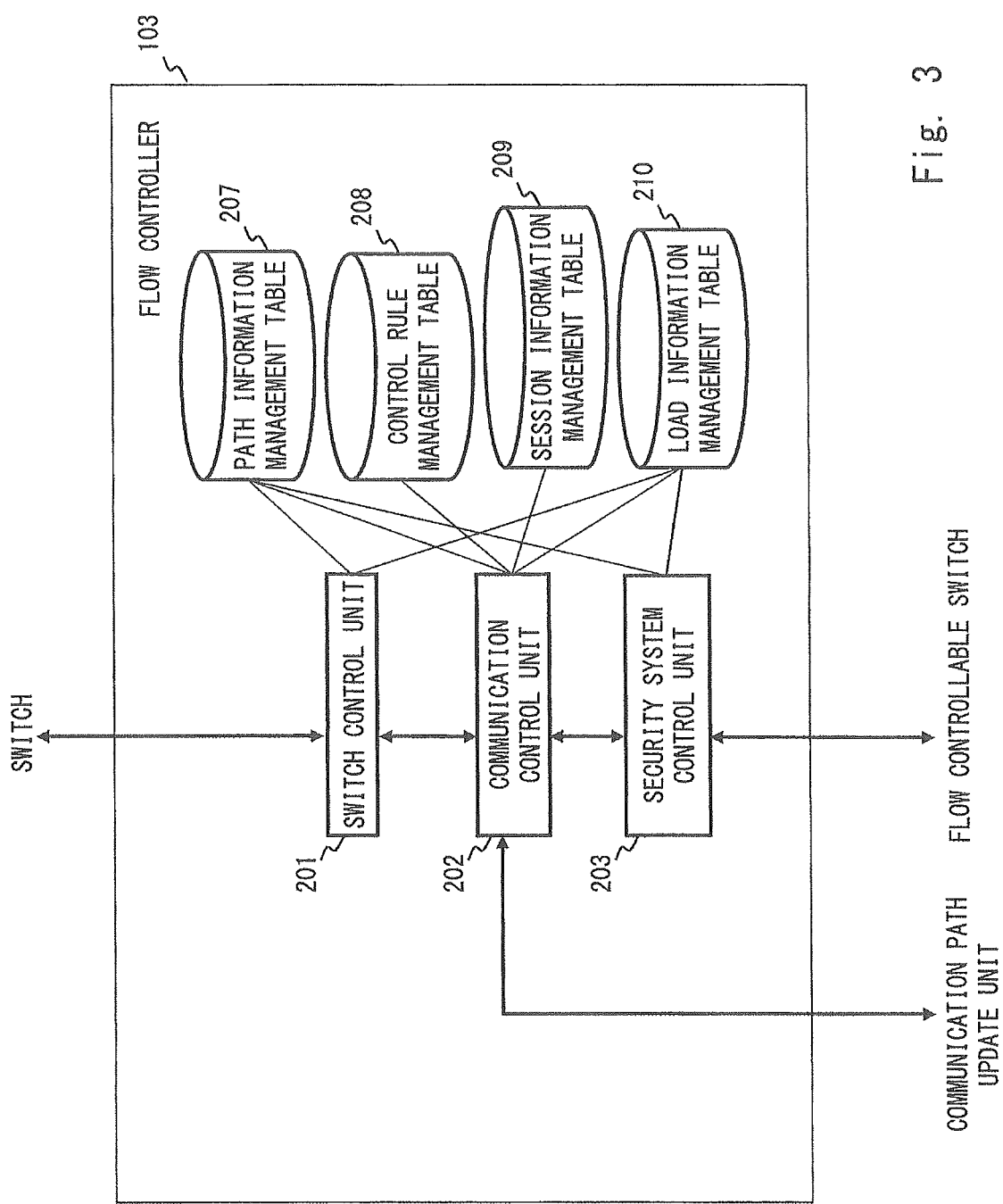
FIG. 3 is a diagram of a flow controller according to the second exemplary embodiment.

A configuration example of the flow controller 103 according to the second exemplary embodiment of the invention is described with reference to FIG. 3. The flow controller 103 includes a switch control unit 201, a communication control unit 202, and a security system control unit 203.

The switch control unit 201 acquires a connection status of an adjacent device, a traffic flow, the number of entries of a flow information management table and the like from the switch 102 and the switch 106 at regular intervals and updates a path information management table 207 and a load information management table 210. Further, the switch control unit 201 receives packets transferred from the switch 102 and the switch 106 and relays them to the communication control unit 202. Furthermore, the switch control unit 201 updates a flow information management table in the switch 102 and the switch 106, receiving an instruction from the communication control unit 202. The flow information management table is a table provided in the switches 102 and 106 and the security systems 104 and 105, and it is described in detail later. Further, the path information management table 207 and the load information management table 210 provided in the flow controller 103 are also described in detail later.

The security system control unit 203 acquires a connection status of an adjacent device, a traffic flow, the number of entries of the flow information management table 211 and the like from the security system 104 and the security system 105 at regular intervals and updates the path information management table 207 and the load information management table 210. Further, the security system control unit 203 receives packets transferred from the security system 104 and the security system 105 and relays them to the communication control unit 202. Furthermore, the security system control unit 203 updates the flow information management table 211 in the security system 104 or the security system 105, receiving an instruction from the communication control unit 202.

The communication control unit 202 checks the contents of the packet transferred from the switch control unit 201 or the security system control unit 203 against the contents of a control rule management table 208, a session information management table 209 and the path information management table 207 and determines an appropriate communication path that reduces the load on the network and the security systems 104 and 105. The communication control unit 202 notifies the determined communication path to the switch control unit 201 or the security system control unit 203. Further, the communication control unit 202 updates the session information management table 209 at regular intervals and, when receiving a path change request from the security system 104 or 105, checks the received information against the contents of the session information management table 209 and instructs a change in path to the switch control unit 201 or the security system control unit 204.

Figure 4:
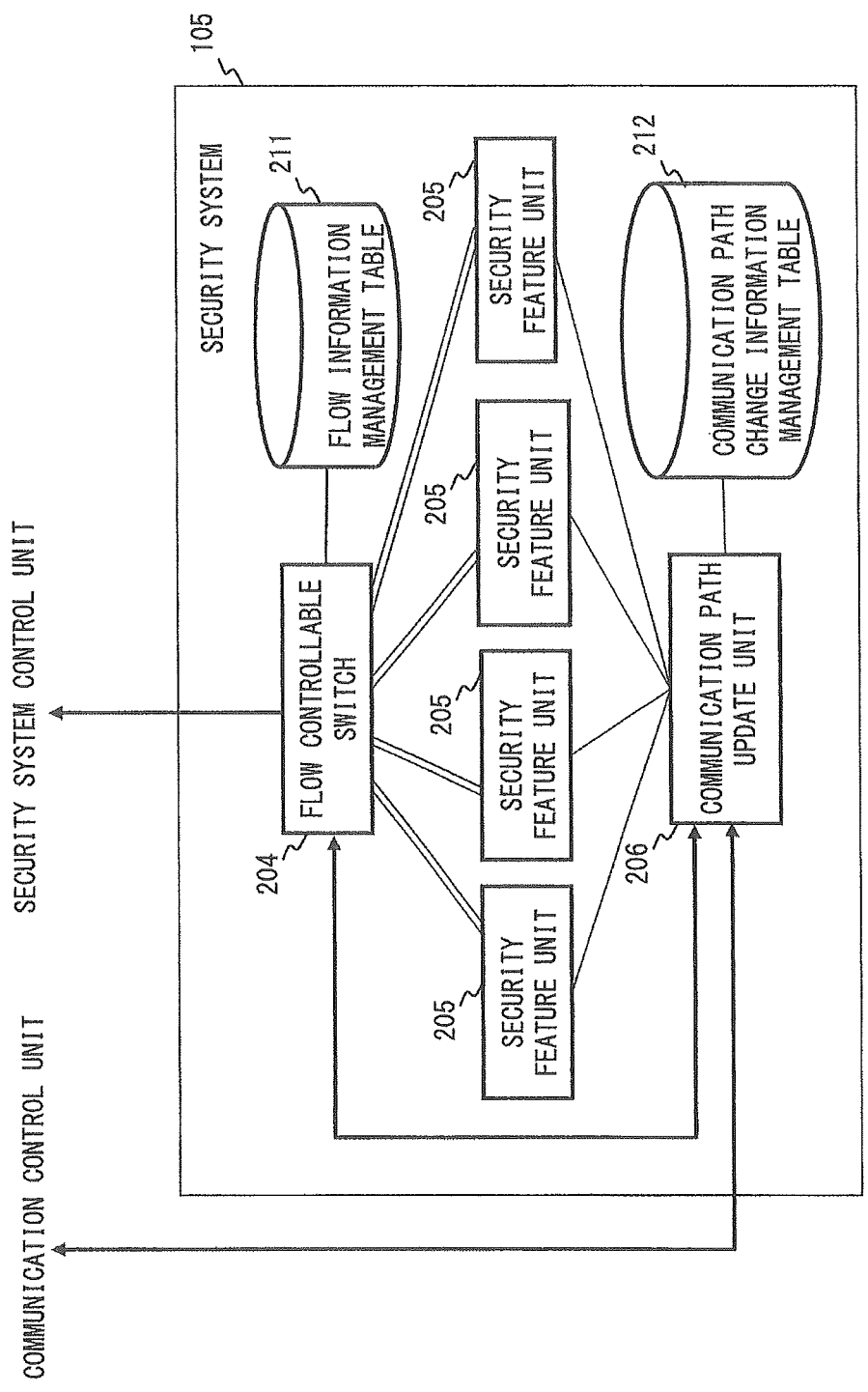
FIG. 4 is a diagram of a security system according to the second exemplary embodiment.

A configuration example of the security system 104 according to the second exemplary embodiment of the invention is described hereinafter with reference to FIG. 4. The security system 105 has the same configuration as the security system 104 and therefore detailed description thereof is omitted. The security system 104 includes a flow controllable switch 204, a security feature unit 205 and a communication path update unit 206.

The flow controllable switch 204 is a device that controls a path of a packet flowing through the communication network, receiving an instruction from the flow controller 103, just like the switches 102 and 106. Further, the flow controllable switch 204 updates the flow information management table 211, receiving an instruction from the flow controller 103.

The security feature unit 205 has a firewall feature, an antivirus feature, an IPS feature and the like. The security feature unit 205 executes control such as discarding the communication according to a preset rule by referring to a header or a payload of a packet. Further, the security feature unit 205 is a device that stores the status of communication passing through itself, and has a function of notifying the communication status stored therein to the communication path update unit 206 in the security system and a function capable of changing the communication status stored therein, receiving an instruction from the communication path update unit 206. The data output from the security feature unit 205 to the flow controllable switch 204 and the data output from the flow controllable switch 204 to the security feature unit 205 may go through different paths from each other by bridge connection as shown in FIG. 4.

When the communication path update unit 206 receives information about the communication status from the security feature unit 205, the communication path update unit 206 checks the received information against the contents of a communication path change information management table 212 included in itself, and when there is a matching entry, requests a change in communication path to the communication control unit 202 in the flow controller 103. Further, the communication path update unit 206 gives an instruction to the security feature unit 205 to make the communication status stored by the security feature unit 205 updatable.

Figure 5:
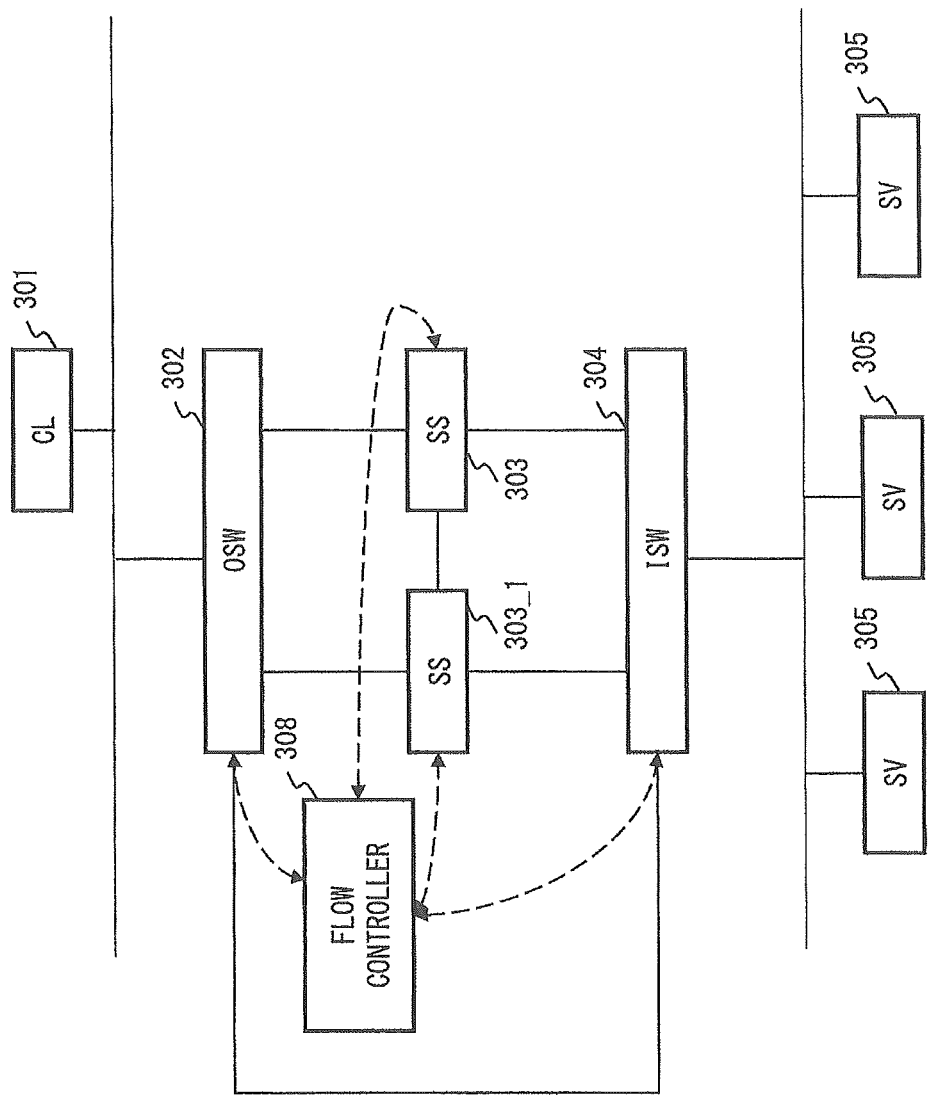
FIG. 5 is a diagram of a network according to the second exemplary embodiment.

A specific network configuration example according to the second exemplary embodiment of the invention is described hereinafter with reference to FIG. 5. The network of FIG. 5 includes CL (Client) 301, OSW 302, SS (Security System) 303, SS 303_1, ISW 304, SV (Server) 305, and a flow controller 308.

The CL 301 is a client terminal that uses a service provided by the SV 305. The CL 301 may be a personal computer device, a mobile phone terminal or the like. The CL 301 is connected with the OSW 302.

The OSW 302 is connected with the CL 301, and transfers data transmitted from the CL 301 to another device and further transfers data addressed to the CL 301 to the CL 301.

The SV 305 is a server device that provides a service to the CL 301. The SV 305 may be configured as a server system composed of a plurality of server devices or may be a single device. The SV 305 is connected with the ISW 304.

The ISW 304 is connected with the SV 305, and transfers data transmitted from the SV 305 to another device and further transfers data addressed to the SV 305 to the SV 305.

The SS 303 and the SS 303_1 are connected with the OSW 302 and the ISW 304 and placed between the OSW 302 and the ISW 304. The SS 303 and the SS 303_1 have a firewall feature.

The flow controller 308 controls the OSW 302, the ISW 304, the SS 303 and the SS 303_1 and sets a communication path between the OSW 302 and the ISW 304. The communication path between the OSW 302 and the ISW 304 may go through the SS 303 or the SS 303_1, or may not go through the SS 303 or the SS 303_1 to directly connect the OSW 302 and the ISW 304. The flow controller 308 has the same configuration as the flow controller 103.

Figure 6:
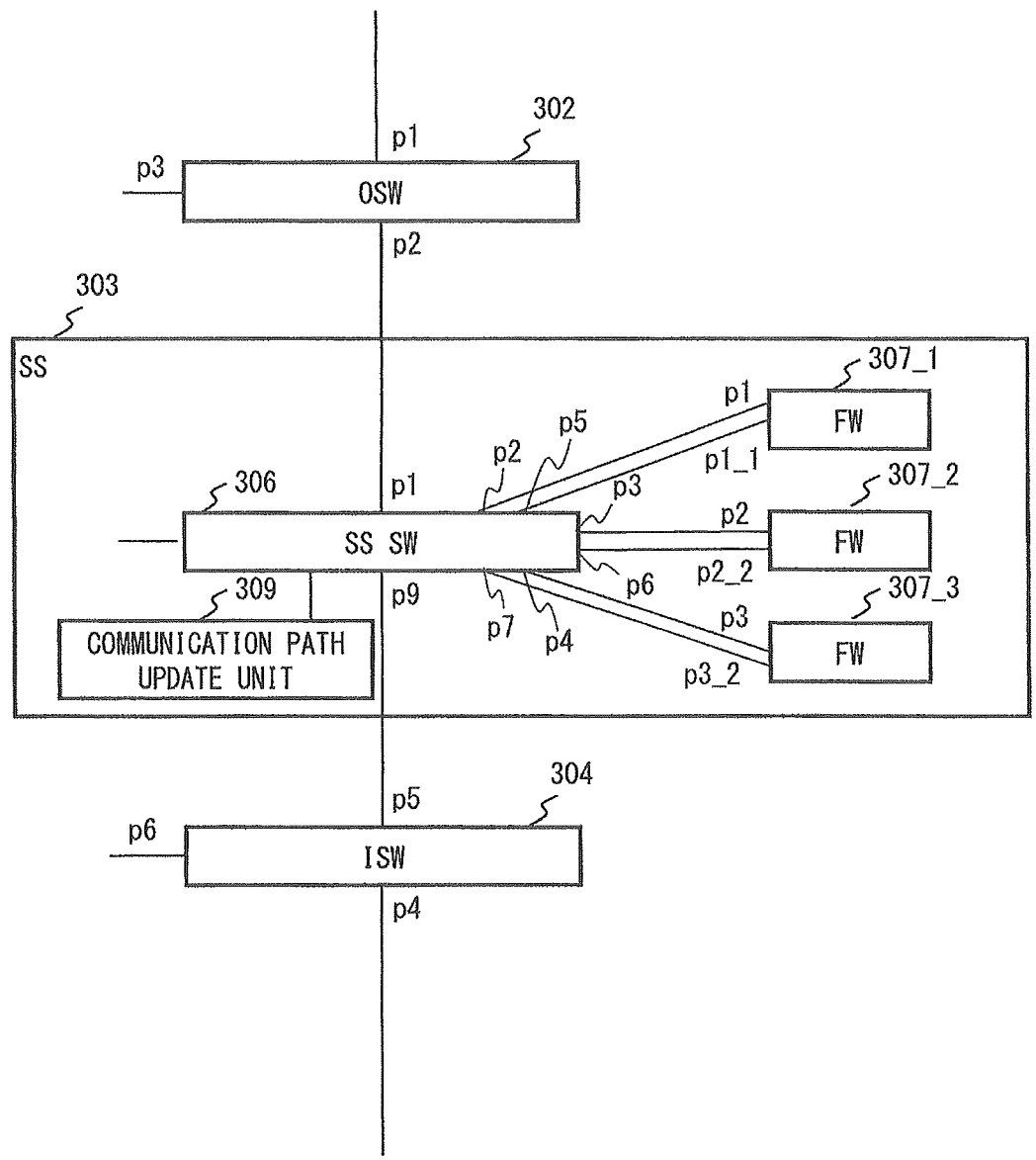
FIG. 6 is a diagram of a security system according to the second exemplary embodiment.

A configuration example of the SS 303 according to the second exemplary embodiment of the invention is described hereinafter with reference to FIG. 6. The SS 303 includes SS-SW 306, FW 307_1 to 3 and a communication path update unit 309. The SS 303_1 has the same configuration as the SS 303 and therefore detailed description thereof is omitted. The SS-SW 306 has the same function as the flow controllable switch 204 in the SS 303. The SS-SW 306 updates information of the flow information management table 211. The FW 307 applies a firewall feature to data received in the SS 303. The number of FW 307 may be one or two or more. In FIG. 6, an example in which three FW 307_1 to 3 are provided is described. The communication path update unit 309 has the same function as the communication path update unit 206 in the SS 303. The communication path update unit 309 updates the information of the communication path change information management table 212.

Further, the SS-SW 306 has a port p1 connected to the OSW 302 and a port p9 connected to the ISW 304. Further, the SS-SW 306 has ports p2 and p5 connected to the FW 307_1, ports p3 and p6 connected to the FW 307_2, and ports p4 and p7 connected to the FW 307_3. Likewise, the OSW 302 has a port p2 connected to the SS-SW 306, a port p1 connected to the CL 301, and a port p3 connected to the OSW 304. The ISW 304 has a port p5 connected to the SS-SW 306, a port p4 connected to the SV 305, and a port p6 connected to the OSW 302. The FW 307_1 has ports p1 and p1_1 connected to the SS-SW 306, the FW 307_2 has ports p2 and p2_1 connected to the SS-SW 306, and the FW 307_β has ports p3 and p3_1 connected to the SS-SW 306.

An information table in the SS 303 and an information table in the flow controller 308 are described hereinbelow. The flow controller 308, like the flow controller 103, has various types of tables.

FIG. 7 shows a configuration example of the load information management table 210. The load information management table 210 is updated as a result that the switch control unit 201 and the security system control unit 203 in the flow controller 308 acquire a resource use status or the like from the OSW 302, the ISW 304 and the SS-SW 306. The switch control unit 201 and the security system control unit 203 update the load information management table 210 at the timing of acquiring the information from the OSW 302, the ISW 304 and the SS-SW 306.

FIG. 7 is described hereinbelow. A system ID is an identifier that can uniquely identify a device from which information is acquired. For example, a device name such as SS, OSW or ISW is used for the system ID. A device type indicates a type sorted by a function of a device. For example, FW, SW or the like is used for the device type. A device ID is an identifier that can uniquely identify devices that belong to the same device type. Link indicates a communication path, which is indicated by port numbers of the respective devices in FIG. 7. For example, when OSW is set as the system ID and p2-p1 is set as Link, it specifies a communication path between the port 2 of the OSW 302 and the port 1 of the SS-SW 306. A type indicates the type of load information acquired from each device. The load information may be a CPU utilization, the number of session table entries, the number of flow entries, an IP packet loss, an IP packet delay and the like, for example.

A value indicates a load condition. A threshold is a value used for identifying whether it is high load or not. When a value exceeding a threshold is acquired from a device, the device is determined to perform processing with high load. Update date and time indicates time information when load information is updated, and it may indicate an elapsed time from a certain time point. A weight is set as a value from 0 to 1 and used for load calculation.

FIG. 8 shows a configuration example of the path information management table 207. The path information management table 207 is updated as a result that the switch control unit 201 and the security system control unit 203 in the flow controller 308 acquire a connection status of an adjacent device from the OSW 302, the ISW 304 and the SS-SW 306 and refer to the load information management table. The switch control unit 201 and the security system control unit 203 update the path information management table 207 at the timing of acquiring the connection status of an adjacent device from the OSW 302, the ISW 304 and the SS-SW 306.

FIG. 8 is described hereinbelow. A system ID, a device type and a device ID are the same as those of FIG. 7, and detailed description thereof is omitted. In is an identifier that can uniquely identify an input port of a network interface. Out is an identifier that can uniquely identify an output port of a network interface.

A system serving as an entrance is a device that outputs data, and a system serving as an exit is a system that receives output data. A path cost is the total of the link cost of the link between a system as an entrance and a system as an exit, which is calculated as "10000/communication band (Mbps)".

Load information is the total of loads of the respective devices by reference to the columns of the load information management table 210 where the system ID, the device type and the device ID match. For example, the load between two points where a set of the system ID, the device type and the device ID is "OSW, SW, 1" and "SS, FW, 1", respectively, is calculated as follows by reference to the first, fourth, seventh to tenth rows of the load information management table 210.

$$\text{Load information} = 0.1 \times 10/80 + 0.2 \times 2000/65000 + 0.2 \times 30000/65000 + 0.7 \times 0.1/3 + 0.1 \times 100/500 = 0.191 \ldots .$$

The calculation method of load information described above is just an example, and the calculation method of load information may be changed according to system.

FIG. 9 shows a configuration example of the control rule management table 208. The control rule management table 208 represents the details of control in a communication path.

FIG. 9 is described hereinbelow. ID is an identifier that can uniquely identify a control rule. Src IP indicates an IP address of a source device. Src Port indicates a port number of a source device. Dst IP indicates an IP address of a destination device. Dst Port indicates a port number of a destination device. Protocol indicates a protocol used for communication. The protocol is TCP, UDP or the like, for example.

Outward path indicates an outward communication path of a packet where Src IP, Src Port, Dst IP and Dst Port match. For example, an outward path is described in a format that identifies (a character string where the system ID, the device type and the device ID are connected with a colon) that can uniquely identify switches or security systems at both ends of a communication path are connected with a hyphen. For the security systems, the system ID and the device ID can be omitted. In the case of going through a plurality of communication paths, the respective communication paths are delimited with a comma in the sequence of go through. Return path indicates a return communication path of a packet where Src IP, Src Port, Dst IP and Dst Port match. The description format is the same as that of the outward path. Further, AV described in the outward and return paths indicates going through an antivirus feature unit in the case where the SS 303 has the antivirus feature unit.

Idle Timeout indicates a timeout value when a no-communication state continues. For example, the value of Idle Timeout may be stored from the entry of the control rule management table 208 to the Idle Timeout column of the flow information management table 211 at the timing of generating the entry of the flow information management table 211. The unit of Idle Timeout is seconds, for example.

Cache Timeout is a period of storing information in the session information management table 209. The value of Cache Timeout may be stored from the entry of the control rule management table 208 to the Session Timeout column of the flow information management table 211 at the timing of generating the entry of the session information management table 209. The unit of Session Timeout is seconds, for example.

Session Update Flag is a flag indicating whether or not to update the Session Timeout column in the entry of the session information management table 209 when the entry is referred to. For example, to set the communication of the succeeding same session to go through the same SS like TCP communication, the flag is set to 1.

FIG. 10 shows a configuration example of the session information management table 209. The session information management table 209 is a table generated by the communication control unit 202 using the control rule management table 208 and the path information management table 207 created in advance. The communication control unit 202 compares the received packet with the control rule management table 208 and the path information management table 207 and determines a communication path for reducing the load on the network or the SS 303.

FIG. 10 is described hereinbelow. Src IP, Src Port, Dst IP, Dst Port, Protocol, an outward path and a return path are the same as those of FIG. 9, and detailed description thereof is omitted.

Priority indicates a priority level. For example, when a plurality of rows of matching entries are found as a communication path, the one with a smaller Priority value is selected. A value from 1 to 65535, for example, is used for Priority.

Session Timeout indicates a time limit for storing information. The entry of the session information management table 209 becomes unneeded when the time stored in the Session Timeout column is reached. The communication control unit 202 refers to the session information management table 209 at regular intervals and deletes the entry no longer needed.

The flow information management table 211 in the OSW 302, the ISW 304 and the SS 303 is a table that is generated by the OSW 302, the ISW 304 and the SS 303, receiving an instruction from the flow controller 308.

The communication path change information management table 212 is a table that is used when dynamically changing a communication path through the SS 303. For example, it is used when dynamically changing a communication path according to a change in the status of communication through the SS 303.

Figure 11:
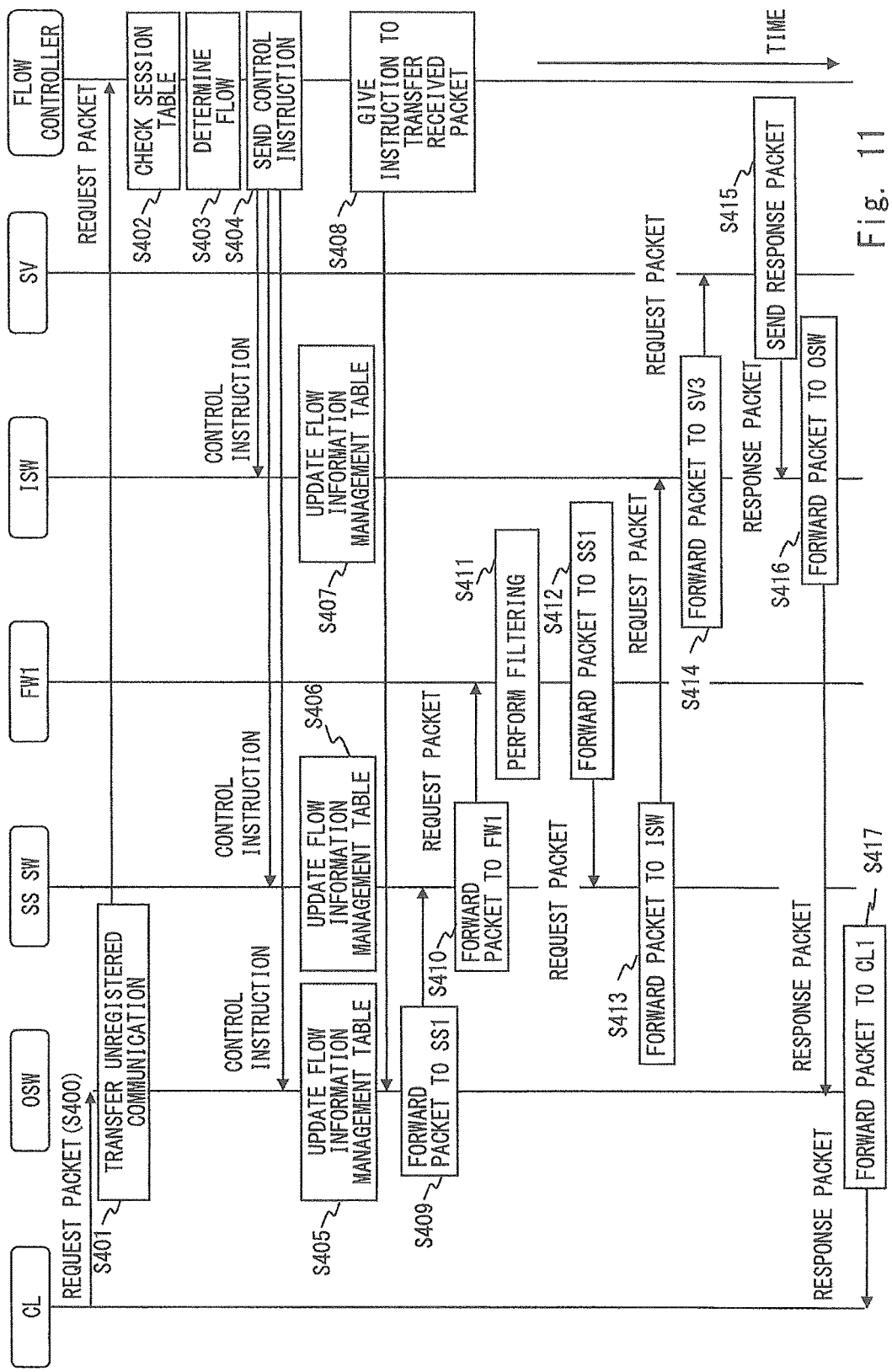
FIG. 11 is a diagram illustrating a flow of data in the path control system according to the second exemplary embodiment.

A flow of data according to the second exemplary embodiment of the invention is described hereinafter with reference to FIG. 11. FIG. 11 shows a flow of data in the case where UDP is used. In FIG. 11, the case of making a request for name solution, which is communication with a destination port number udp/53 to be specific, from the CL 301 with the IP address 10.0.0.5 to the SV 305 which is a DNS server with the IP address 192.168.1.4 is described as an example.

First, the CL 301 sends a request packet to the OSW 302 (S400). The OSW 302 searches the flow information management table 211 using information of the received request packet, such as an input port, a source MAC address, a destination MAC address, a protocol number, a source IP address, a source port number, a destination IP address and a destination port number, for example, as a key, and checks whether there is a matching entry. When it is assumed that there is no matching entry in the flow information management table 211, the OSW 302 stores the request packet into a receiving buffer once, and transfers the request packet to the flow controller 308 (Step S401). Specifically, the OSW 302 makes an inquiry about a control method for the request packet and subsequent packets to the flow controller 308.

The flow controller 308 searches the session information management table 209 using header information of the received packet as a key and checks whether there is a matching entry (S402). When it is assumed that there is no matching entry in the session information management table 209, it then searches the control rule management table 208 using header information of the received packet as a key. When it is assumed that there is a matching entry in the control rule management table 208, it then searches the path information management table 207 using the outward and return path columns of the matching entry as a key, and thereby determines the most appropriate path (S403).

To be specific, the flow controller 308 sequentially refers to the information delimited with a comma in the outward and return path columns in the control rule management table 208 and then searches the information in the path information management table 207. In this manner, the flow controller 308 compares the character string on the left of a hyphen in the outward path column and the identification information of the system as an entrance in the path information management table 207 and further compares the character string on the right of a hyphen in the return path column and the device type of the system as an exit in the path information management table 207, and extracts the matching row. When there are plurality of matching rows, only one row with the smallest value of the load information is extracted by reference to the load information column. When there are plurality of matching rows where the value of the load information is the same, only one row with the smallest value of the path cost is extracted by reference to the path cost column. When there are plurality of matching rows where the path cost is the same, only the first matching row is extracted.

The flow controller 308 gives an instruction for update of the flow information management table 211 in the OSW 302, the ISW 304 and the SS 303 to each device based on In and Out of the system as an entrance and the system as an exit in the matching row (S404). In this manner, all of the information delimited with a comma in the outward and return path columns in the control rule management table 208 are processed, and the OSW 302, the ISW 304 and the SS 303 update the flow information management table 211 (S405 to S407). A configuration example of the flow information management table 211 is described hereinafter with reference to FIGS. 12 to 14. FIG. 12 is the flow information management table 211 in the OSW 302. FIG. 13 is the flow information management table 211 in the SS 303. FIG. 14 is the flow information management table 211 in the ISW 304.

Ingress Port is an identifier that can uniquely identify an input port. Src HWAddr is a MAC address of a source device. Dst HWAddr is a MAC address of a destination device. Src IP, Src Port, Dst IP, Dst Port and Protocol are the same as those described above. dl_type is a type number of Ethernet (registered trademark). The type number of Ethernet (registered trademark) is a number used to identify a high-order protocol when viewed from the data link layer. Egress Port is an identifier that can uniquely identify an output port. Idle Timeout indicates a time limit for storing information.

Referring back to FIG. 11, after updating the flow information management table 211 in the OSW 302, the ISW 304 and the SS 303, the flow controller 308 gives an instruction to the OSW 302 to output the received packet stored in the receiving buffer of the OSW 302 from the p2 port (S408). Then, the OSW 302 outputs the corresponding received packet stored in the receiving buffer from the p2 port based on the flow information management table 211 and forwards it to the SS 303 (S409). Further, the OSW 302 may receive the received packet transferred from the flow controller 308. Then, the SS-SW 306 forwards the packet to the FW 1 by the p2 port described in the Egress Port column based on the flow information management table 211 (S410). After that, the FW 1 compares the header of the received packet with the preset filter setting and determines whether or not to permit transfer of communication (S411). A case where the transfer is permitted is described hereinbelow.

Then, the FW 1 refers to the header of the request packet and its routing table and forwards the packet to the SS 303 (S412). The SS 303 then forwards the packet to the ISW by the p9 port described in the Egress Port column (S413). Then, the ISW forwards the packet to the SV 305 by the p4 port described in the Egress Port column (S414). Then, the SV 305 sends a response packet out to the ISW in response to a request from the client (S415).

Then, the ISW forwards the packet to the OSW by the p6 port described in the Egress Port column (S416). Then, the OSW forwards the packet to the CL 301 by the p1 port described in the Egress Port column (S417).

The subsequent packets are transferred according to the contents of the flow information management table set in Steps S405, S406 and S407. The same processing as in Steps S409 to S417 is performed until the entries of the flow information management table in the OSW 302, the ISW 304 and the SS 303 are deleted.

Figure 15:
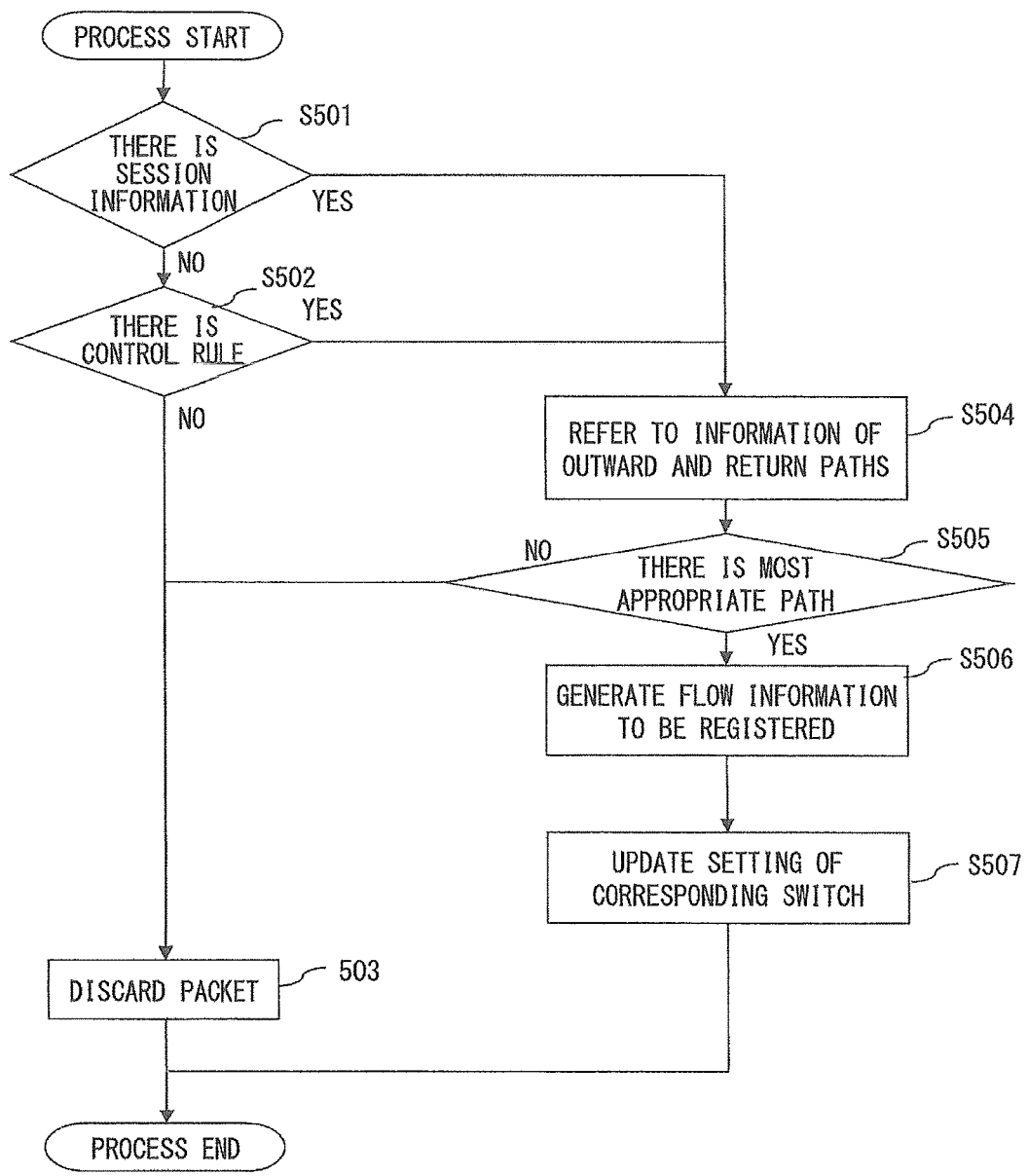
FIG. 15 is a diagram illustrating a flow of a path selection process in the flow controller according to the second exemplary embodiment.

A flow of a path selection process in the flow controller 308 according to the second exemplary embodiment of the invention is described hereinafter with reference to FIG. 15. First, the flow controller 308 searches the session information management table 209 using information of the packet received from the OSW 302 as a key (S501). When there is no matching row in Step S501, the flow controller 308 searches the control rule management table 208 using information of the packet received from the OSW 302 as a key (S502). When there is no matching row, the received packet is discarded (S503).

When there is a matching row in Step S501 or S502, the flow controller 308 sequentially refers to the information delimited with a comma in the outward and return path columns in the row extracted in Step S501 or S502 (S504).

Then, the flow controller 308 searches the path information management table 207 using information referred to in Step S504 as a key and determines the most appropriate path in consideration of the load on each device and the like (S505). When the most appropriate path cannot be uniquely identified, the received packet is discarded (S503). On the other hand, when the most appropriate path can be uniquely identified, the flow controller 308 generates instruction information for instructing information related to the determined most appropriate path to the OSW 302, the SS 303 and the ISW 304 (S506). The flow controller 308 then sends the instruction information to the OSW 302, the SS 303 and the ISW 304, and the flow information management table 211 is updated in the OSW 302, the SS 303 and the ISW 304 (S507).

When Idle Timeout is reached, the entries of the flow information management table 211 are deleted, and calculation of the most appropriate communication path (Steps S501 to S507) is carried out. When the entries of the flow information management table 211 are deleted, a path with the lowest load is reselected in the flow controller 308 based on the load information column in the path information management table 207, and thereby the network load can be equalized.

Figure 16:
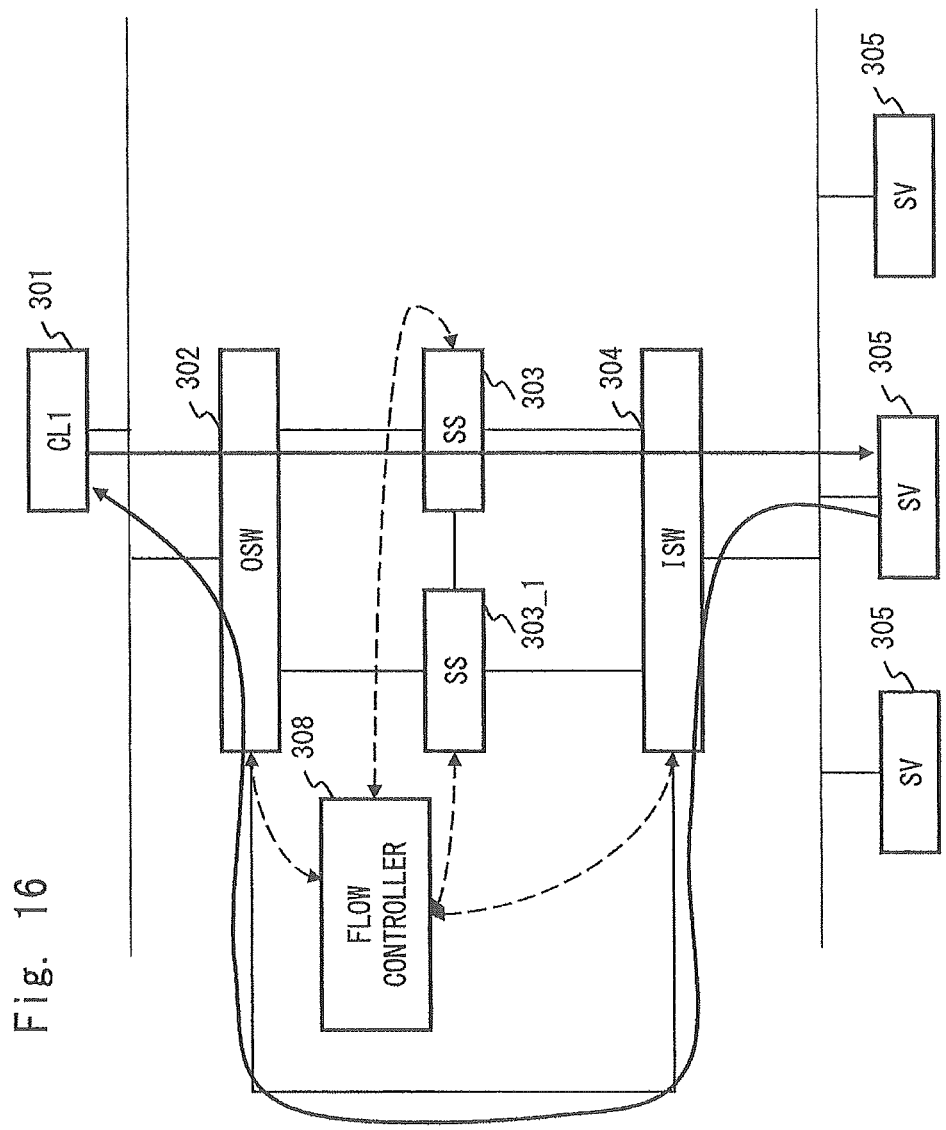
FIG. 16 is a diagram illustrating a CL-SV path according to the second exemplary embodiment.

By executing the processing of Steps S401 to S407 in FIG. 11, the flow controller 308 controls the path to go through the SS 303 in the outward path and not to go through the SS 303 in the return path as shown in FIG. 16. Because only the outward path goes through the SS 303, the CPU load in the SS 303 can be reduced. Further, because communication in the return path does not go through the SS 303, the communication does not flow between the ISW 304 and the SS 303 and between the SS 303 and the OSW 302 in the return path, so that the network band can be used for another communication.

Figure 17:
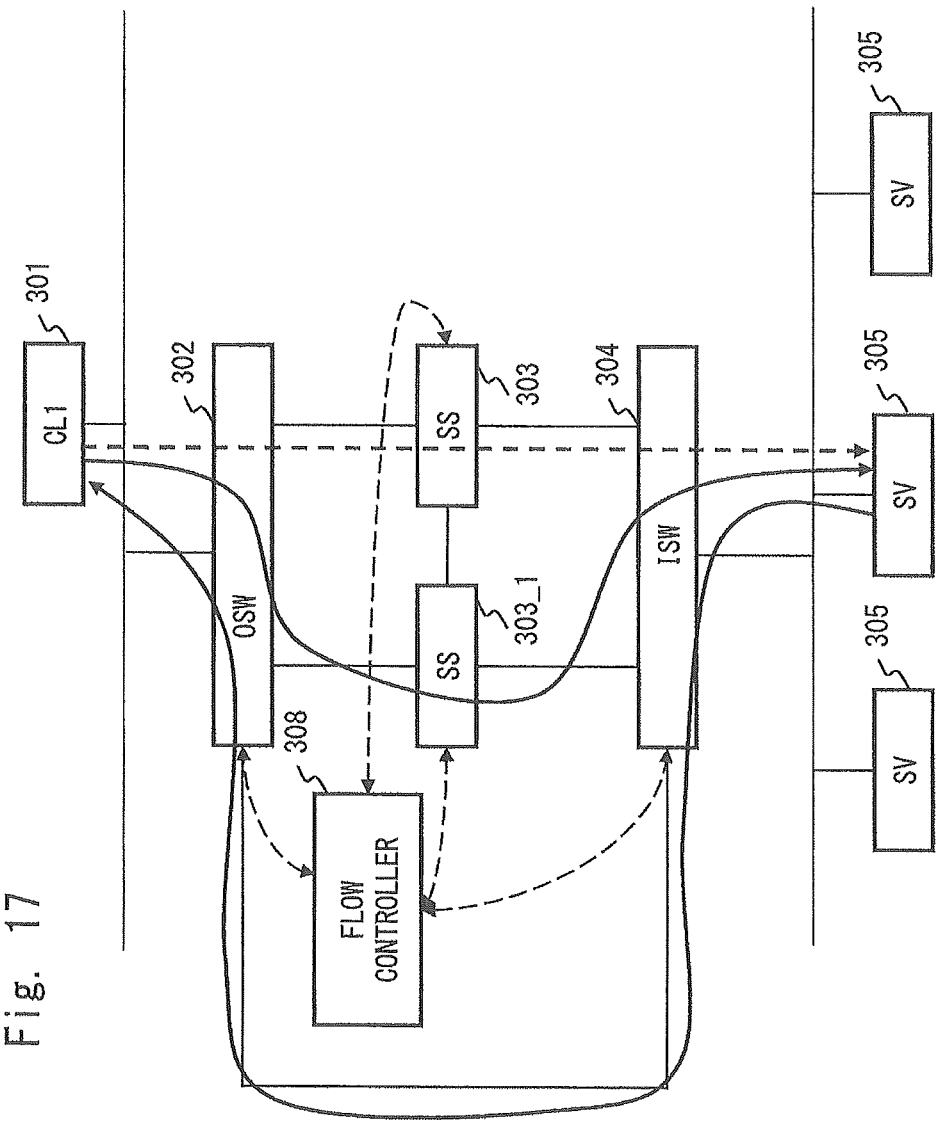
FIG. 17 is a diagram illustrating a CL-SV path according to the second exemplary embodiment.

Further, when a device in the SS 303 becomes a high load state, the path may be changed dynamically as shown in FIG. 17. Specifically, by changing the path to go through the SS 303_1 instead of the SS 303, concentration of the load on a specific SS can be reduced.

There are many cases where not all of communications need to go through a firewall, like DNS communication. The present invention is particularly effective in UDP communication where data is exchanged continuously for a long time through the same port.

Figure 18:
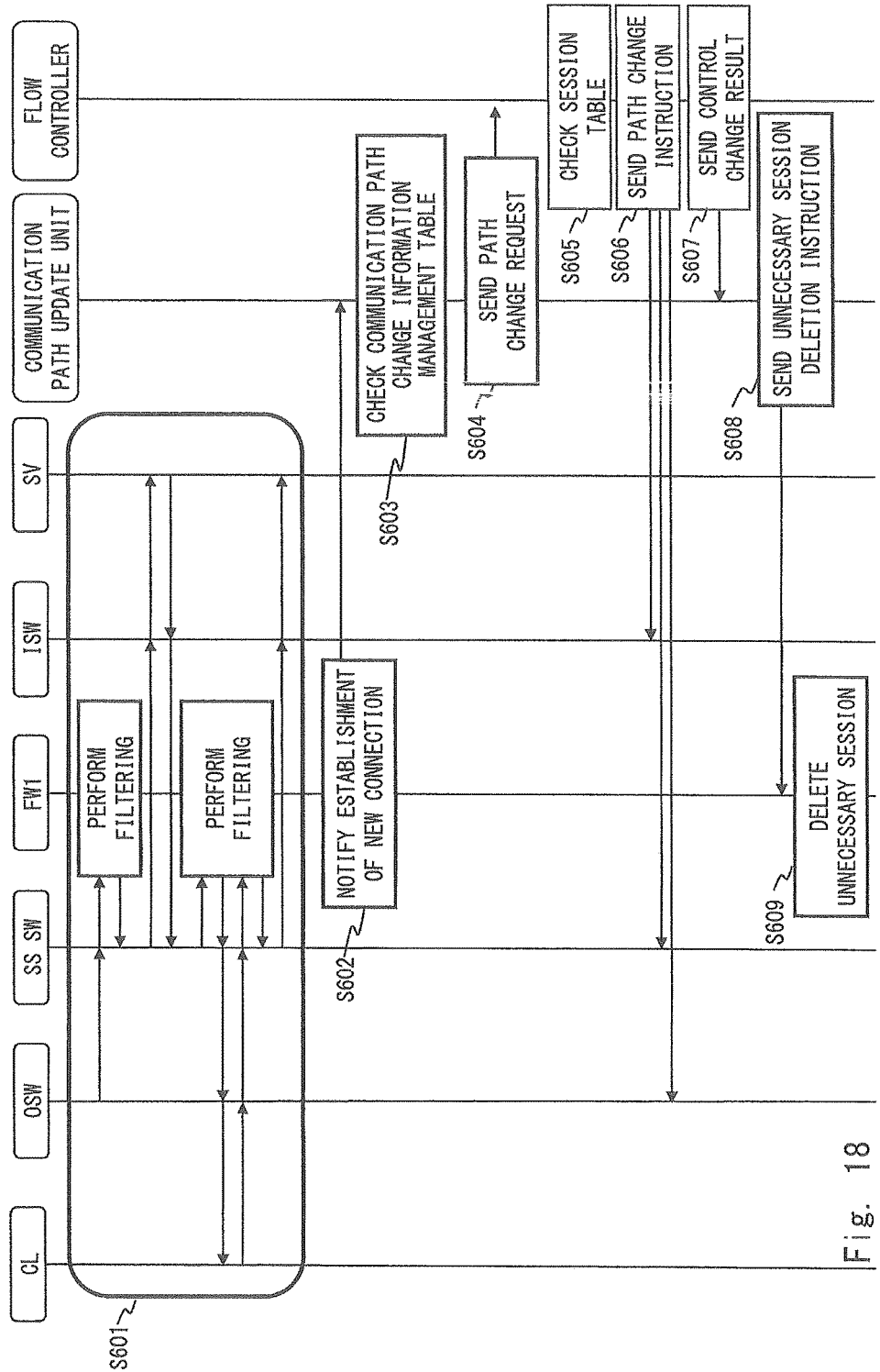
FIG. 18 is a diagram illustrating a flow of data in the path control system according to the second exemplary embodiment.

A flow of data according to the second exemplary embodiment of the invention is described hereinafter with reference to FIG. 18. FIG. 18 shows a flow of data in the case where the TCP is used. Communication using TCP is different from communication using UDP in that a communication path is controlled to go through the security system before establishing a connection and not to go through the security system after establishing a connection.

In FIG. 18, the case of making a request from the CL 1 with the IP address 10.0.0.1 to the SV 305 which is a Web server with the IP address 192.168.1.3 (communication with a destination port number tcp/80) is described as an example.

FIG. 18 shows the process after Steps S405 to S407 in FIG. 11. In the operation in the case of using TCP, a communication path is controlled according to the contents of the control rule management table 208 just like UDP, until establishing a connection. To be specific, a communication path before establishing a connection is determined based on information of the outward and return path columns in the row with ID=3 in the control rule management table 208 of FIG. 9 and the contents of the path information management table. Before establishing a connection, a TCP 3-Way handshake packet flows through devices in the following order. After completion of the transfer of the 3-Way handshake packet, a connection is established.

OSW→SS SW→FW→SS SW→ISW→SV3→ISW→SS SW→FW→SS SW→OSW→→CL1→OSW→SS SW→SS SW→ISW→SV3 (S601). Further, in the FW, filtering is performed.

The operation after establishing a connection is described hereinafter. The FW 307 in the SS 303 notifies session information (a source IP address, a source port number, a destination IP address, a destination port number, a protocol number, a communication status) of the corresponding communication to the communication path update unit 309 at the timing of detecting establishment of a new connection (S602).

When the communication path update unit 309 receives the information for establishment of a new connection (a source IP address, a source port number, a destination IP address, a destination port number, a protocol number, a communication status) from the FW 307, it checks the received information against the communication path change information management table 212 included therein to search for the matching row (S603). When there is no matching row, the process is aborted.

FIG. 19 shows a specific example of the communication path change information management table 212. When a matching row is found in Step S603, a request for a change in the path of the corresponding communication is made to the flow controller 308 by reference to information of the Action column in the matching row (for example, the first row in the figure) (S604). Specifically, it is described in the Action column in the first row that the FW is excluded from the outward and return paths.

FIG. 20 shows a specific example of information transmitted and received between the communication path update unit 309 and the flow controller 308. Hereinafter, the case where the matching row is found is described as an example. Receiving the path change request from the communication path update unit 309, the flow controller 308 checks whether there is a matching row in the session information management table 209 included in itself using the source IP address, the source port number, the destination IP address, the destination port number and the protocol number of the received information as a key.

when the matching row is not found, the process is aborted, and a notification about a failure in changing the path information is sent to the communication path update unit 309. On the other hand, when the matching row is found, the contents of the matching row in the session information management table 209 are changed based on the contents of the received path change request (S605).

FIGS. 21 and 22 show the contents of the session information management table 209 before change and after change, respectively. The flow controller 308 gives an instruction to change a path to the related switches OSW 302, SS1, SW 303 and ISW 304 based on the information of the updated session information management table 209 (S606).

The path of the communication is thereby changed not to go through the security system. After the path change, the flow controller 308 sends a path change result made in response to the path change request to the communication path update unit 309 (S607).

Acquiring the result in response to the path change request, the communication path update unit 309 refers to the received information and checks whether the processing is done as requested. When it is not done as requested, the process is aborted. When it is done as requested, an instruction to delete the corresponding session information is sent to the FW 1 (S608).

Receiving the instruction from the communication path update unit 309, the FW 1 deletes the entries of the corresponding session information from its session table (S609). When the processing of Step S609 is not performed, the session information after establishing a connection remains stored in the memory of the FW 1 for a specified period of time. Because the corresponding communication does not go through the FW 1 after that and therefore the memory is unnecessarily used, deletion is performed to open the memory no longer needed.

Figure 23:
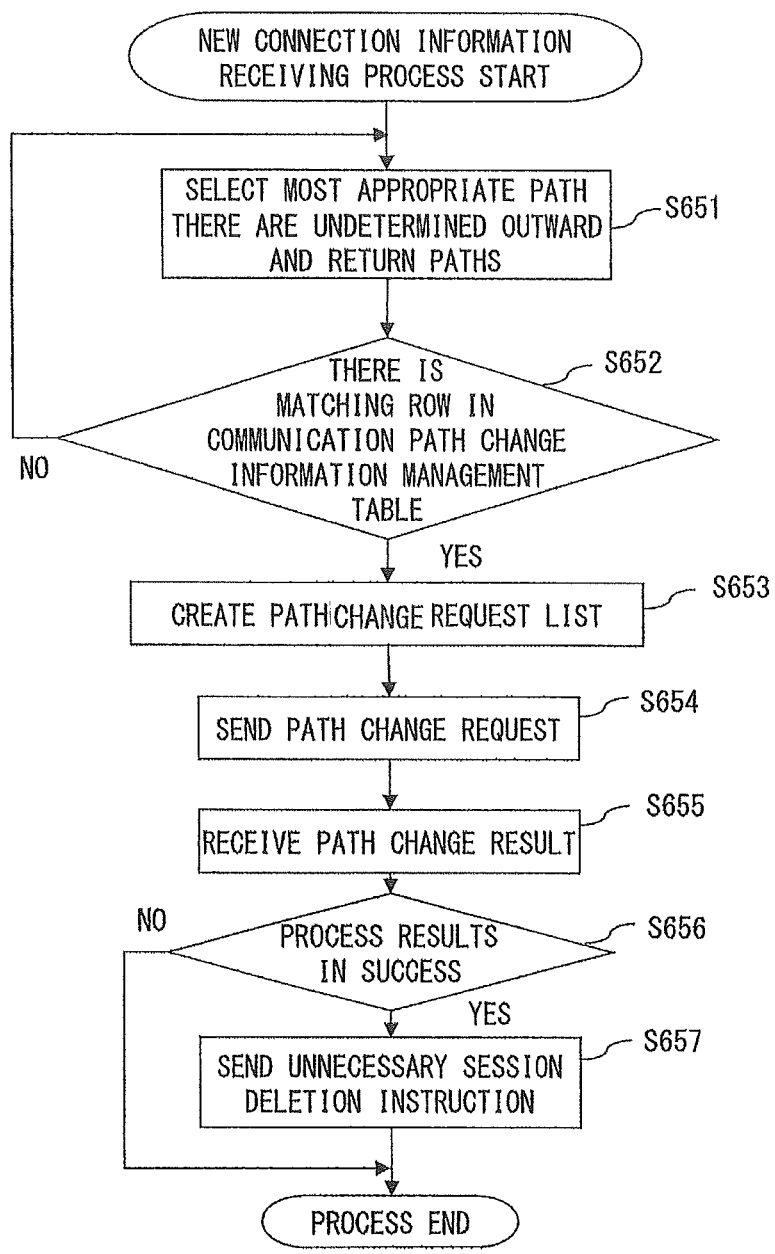
FIG. 23 is a diagram illustrating a flow of a process in the communication path update unit according to the second exemplary embodiment.

A flow of a process in the communication path update unit 309 is described hereinafter with reference to FIG. 23. First, the communication path update unit 309 sequentially check a plurality of information for establishment of a new connection (information of a source IP address, a source port number, a destination IP address, a destination port number, a protocol number and a communication status as one set) received from the FW 307 (S651).

Then, the communication path update unit 309 refers to the communication path change information management table 212 and searches for a matching row using the information for establishment of a new connection (a source IP address, a source port number, a destination IP address, a destination port number, a protocol number and a communication status) as a key (S652). When there is no matching row, the process returns to Step S651 and checks the next new connection information. When there is a matching row, the process proceeds to Step S653.

After that, the communication path update unit 309 creates a path change request list based on the information of the matching row in the communication path change information management table 212. Specifically, the information of the matching row is stored into the Parameter list of FIG. 20 (S653).

Then, the communication path update unit 309 adds the preset information "Request=replace, Retry-0, Retry Interval=0, Delay=0" to the path change request list created in Step S653 and makes a request for a path change to the Controller (S654).

Then, the communication path update unit 309 receives a processing result for the path change request from the flow controller 308 (S655). The communication path update unit 309 proceeds to Step S657 when the processing result received from the flow controller 308 is a success (S656). On the other hand, when the processing result is a failure, the process ends (S656). Then, the communication path update unit 309 gives an instruction to delete the corresponding session information to the FW 307 (S657). The communication path update unit 309 repeats the processing of Steps S651 to S657 each time acquiring information for establishment of a new connection from the FW 307.

The flow of the operation of the communication path update unit 309 is as described above. In this manner, by controlling a communication path to go through a firewall until establishing a TCP connection and not to go through a firewall after establishing a TCP connection, it is possible to reduce unnecessary communications as well as ensuring the security.

According to the exemplary embodiment of the invention, it is possible to prevent load concentration on a specific security system and thereby avoid a bottleneck in the network. In the case of TCP communication where data is exchanged by maintaining a connection and when a large volume of data is exchanged, the present invention exerts a larger effect as the amount of communication increases.

For UDP also, communication may be controlled not to go through a security system based on the session information stored in a device having a firewall feature, in the same manner as for TCP. For example, for UDP communication where data has been once exchanged between a client and a server in the same set of IP address and port number, a communication path may be controlled not to go through a security system during a specified period of time (during a period when there is the corresponding entry in the flow information management table) by sharing information of the corresponding session among the device having a firewall feature, the communication path update unit 309 and the flow controller 308.

Third Exemplary Embodiment

Figure 24:
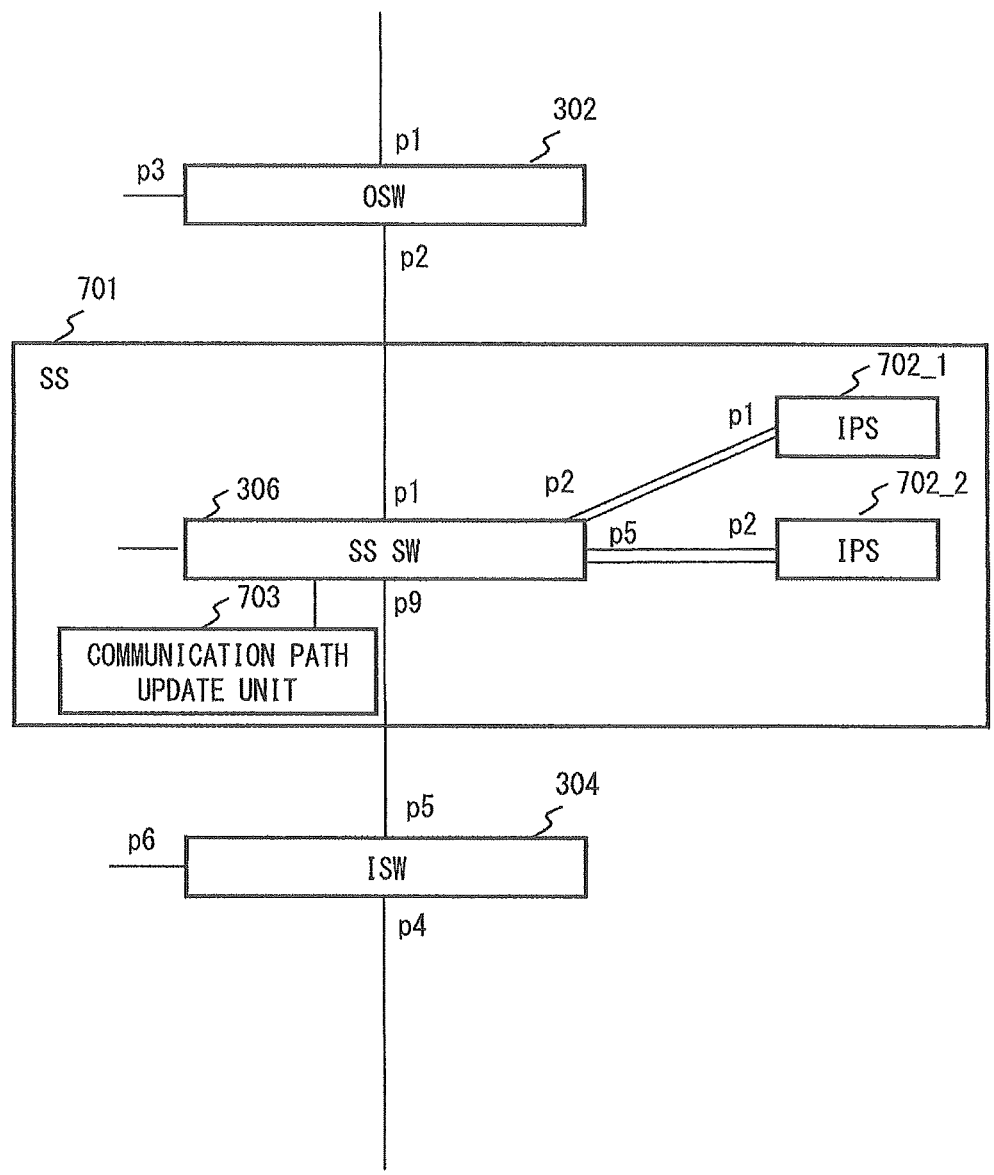
FIG. 24 is a diagram of a security system according to a third exemplary embodiment.

A configuration example of an SS 701 according to a third exemplary embodiment of the invention is described hereinafter with reference to FIG. 24. The SS 701 is placed in the same position as the SS 303 in FIG. 3 in the network. The SS 701 includes an IPS (Intrusion Prevention System) 702, a communication path update unit 703, and an SS-SW 704. The SS-SW 704 is the same as the SS-SW 306 in FIG. 3, and the communication path update unit 703 is the same as the communication path update unit 309 in FIG. 3.

The IPS 702 refers to not only the header but also the payload of the communication to check whether there is no security problem. Therefore, the IPS 702 is a device that is likely to become a high load state compared with a firewall device and thus likely to behave as a bottleneck in the network.

Although one way to ease a bottleneck in the network is to make exception setting in the IPS 702 to exempt specific communication from checking in a static manner, checking is conducted more than necessary in most actual operations due to a reason that communication cannot be exempted from checking as long as there is little possibility of causing a problem. Thus, the IPS 702 is likely to behave as a bottleneck in the network due to excessive checking under the present circumstances. In view of this, a flow of a process of data to solve such a problem is described with reference to FIG. 25.

Figure 25:
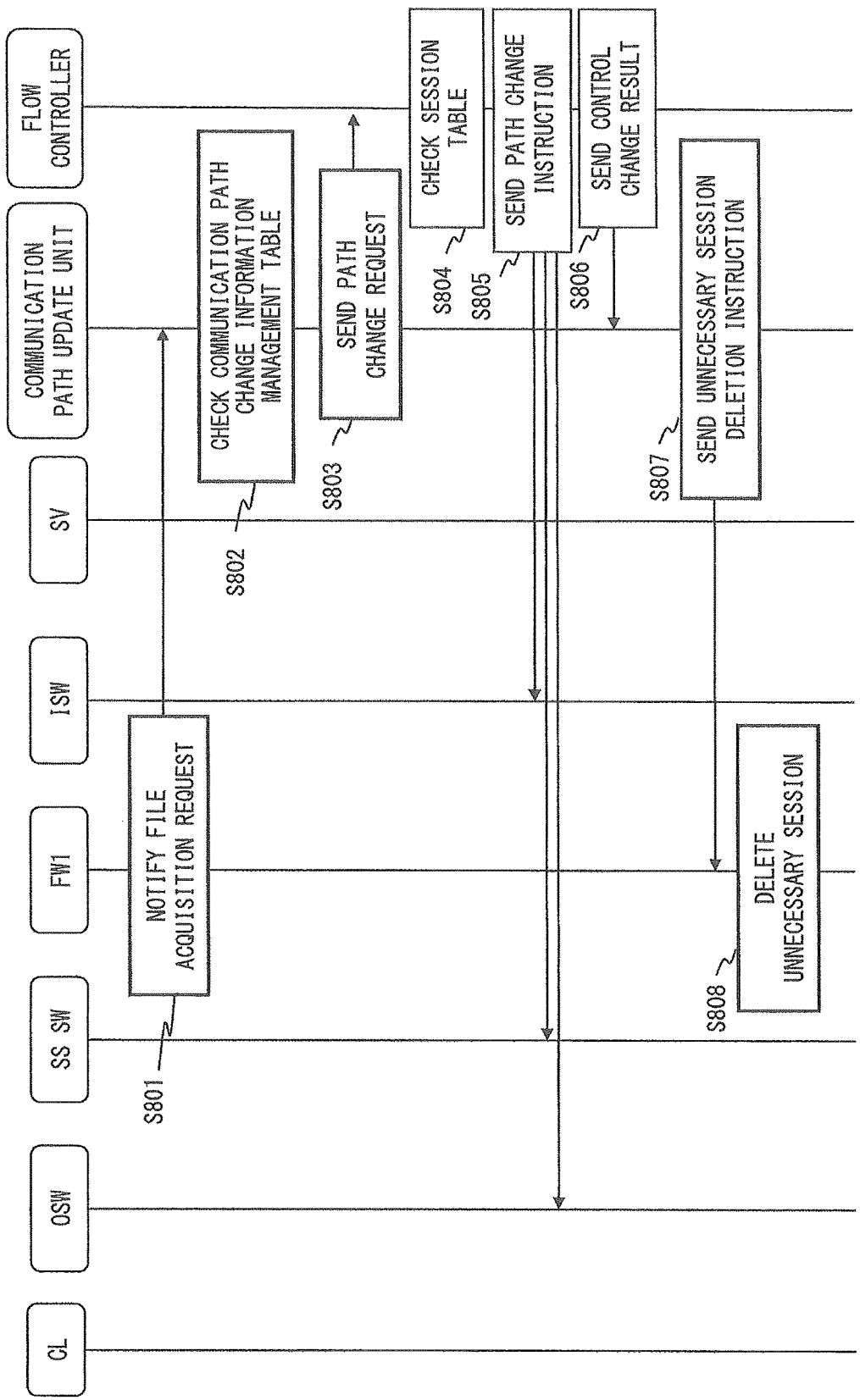
FIG. 25 is a diagram illustrating a flow of data in a path control system according to the third exemplary embodiment.

In FIG. 25, the case of making a request from the CL 1 with the IP address 10.0.0.1 to the web server SV 305 with the IP address 192.168.1.3 (communication with a destination port number tcp/80) is described as an example.

FIG. 25 shows the process after Steps S405 to S407 in FIG. 11. The IPS 702 having an IPS feature in the SS 701 compares the rule shown in FIG. 26 defined in advance with the communication flowing through itself. When the communication flowing through the IPS 702 matches the rule in the first row that allows bypassing, it notifies information (a source IP address, a source port number, a destination IP address, a destination port number, a protocol number, a communication status) of the communication to the communication path update unit 703 (S801).

Figure 27:
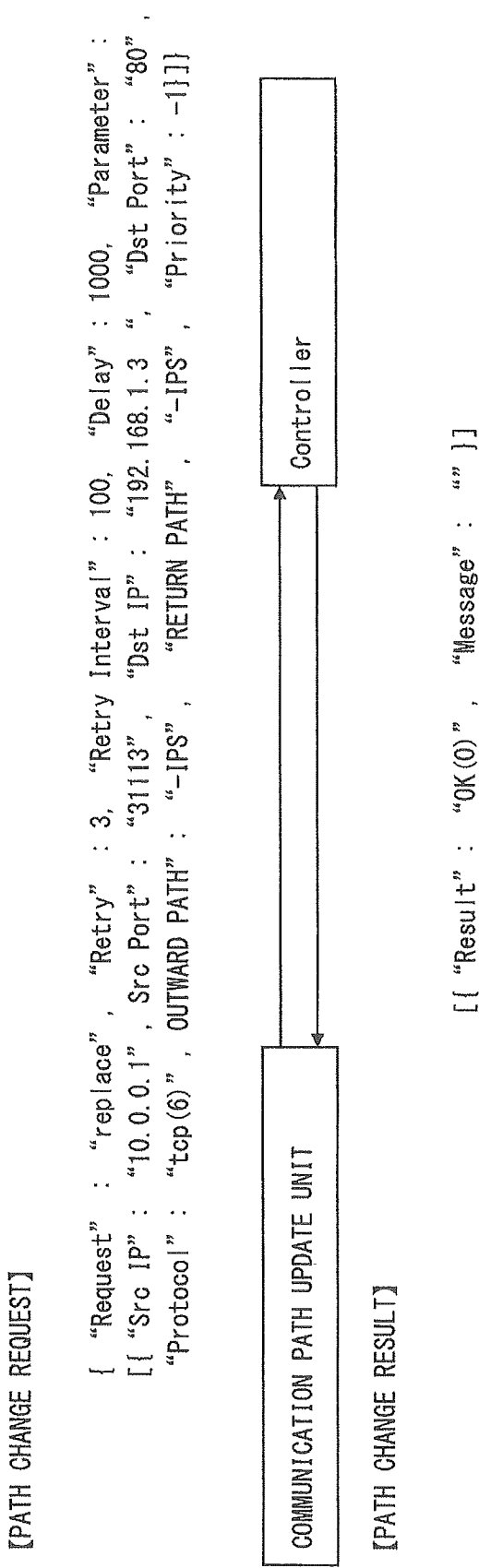
FIG. 27 is a diagram showing information transmitted and received between a communication path update unit and a flow controller according to the third exemplary embodiment.

Steps S802 to S808 are the same as Steps S603 to S609 in FIG. 18, and therefore detailed description thereof is omitted. FIG. 27 shows a specific example of information transmitted and received between the communication path update unit and the flow controller. Further, FIGS. 28 and 29 show the contents of the session information management table before and after the update of the session information management table in Step S804, respectively. The part enclosed in dotted line is the updated part.

In this manner, by dynamically changing a communication path not to conduct checking more than necessary and not to go through the IPS device, it is possible to reduce the load on the security system and the network. By the load reduction, the performance of the whole network can be improved. Like the case of TCP, the present invention exerts a larger effect in the case where a large volume of data is exchanged in the same session.

The advantageous effects of the present invention are described hereinafter. According to the present invention, it is possible to reduce the load on the security device and eliminate a bottleneck on the communication network, thereby improving the network performance. This is because a communication path is controlled dynamically by referring to the path information management table and the control rule management table, such as setting different paths for the outward path and the return path and checking only the outward path with the security system for UDP, or checking only the communication until establishing a connection for TCP, so that only the necessary communication flows through the security system on the network.

Further, it is possible to reduce the load on the security device without using a field in a header of a packet that is generally used for QoS, such as a ToS field in an IP header. This is because the flow controller controls a communication path by giving an instruction to the flow controllable switch on the network by reference to the predefined rule existing on the flow controller and the load information on the security device and the network collected regularly, without updating the field in the header of the packet generally used for QoS.

Further, it is possible to improve the network performance also in the case of a security device (IPS, antivirus, URL filter etc.) different from a firewall feature. This is because the communication path update unit in the security system and the communication control unit in the flow controller dynamically perform path control in collaboration with each other, so that only the necessary communication flows through the security system on the network.

Further, it is possible to reduce the load on the security device even in the environment where NAT/NAPT setting is made in a network to be protected. This is because the flow of communication can be freely controlled according to setting with use of the control rule management table.

Further, it is possible to improve the network performance without concentration of load on a specific device. This is because, when communication path control information is stored once in the flow information management table, communication of the same session is controlled for a while by the registered rule, and therefore there is no case where all communications are transferred to the flow controller. Further, the period of storing the control information in the flow information management table can be changed as appropriate by the control rule management table, and control can be made so that the load does not concentrate on the flow controller.

The present invention is not limited to the above-described exemplary embodiments, and various changes and modifications may be made without departing from the scope of the invention.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2012-47051, filed on Mar. 2, 2012, the disclosure of which is incorporated herein in its entirety by reference.

REFERENCE SIGNS LIST

10 COMMUNICATION DEVICE
20 COMMUNICATION DEVICE
30 SECURITY DEVICE
40 PATH CONTROL DEVICE
101 SERVER
102 SWITCH
103 FLOW CONTROLLER
104 SECURITY SYSTEM
105 SECURITY SYSTEM
106 SWITCH
107 CLIENT
201 SWITCH CONTROL UNIT
202 COMMUNICATION CONTROL UNIT
203 SECURITY SYSTEM CONTROL UNIT
204 FLOW CONTROLLABLE SWITCH
205 SECURITY FEATURE UNIT
206 COMMUNICATION PATH UPDATE UNIT
207 PATH INFORMATION MANAGEMENT TABLE
208 CONTROL RULE MANAGEMENT TABLE
209 SESSION INFORMATION MANAGEMENT TABLE
210 LOAD INFORMATION MANAGEMENT TABLE
211 FLOW INFORMATION MANAGEMENT TABLE
212 COMMUNICATION PATH CHANGE INFORMATION MANAGEMENT TABLE
301 CL
302 OSW
303 SS
304 ISW
305 SV
306 SS-SW
308 FLOW CONTROLLER
309 COMMUNICATION PATH UPDATE UNIT
701 SS
702 IPS
703 COMMUNICATION PATH UPDATE UNIT
704 SS-SW

The invention claimed is:

1. A path control system comprising:
a first communication device;
a second communication device;
a security device; and
a flow controller;
wherein the security device comprises;
at least one memory storing instructions, and
at least one processor configured to execute the instructions to:
provide a security feature to data transmitted and received between the first communication device and the second communication device;
wherein the flow controller comprises:
at least one memory storing instructions, and
at least one processor configured to execute the instructions to:
select one of a first path through the security device and a second path not through the security device as a communication path of the data based on a path information table where an attribute of the data and a communication path between the first communication device and the second communication device are associated,
when Transport Control Protocol (TCP) is determined to be used for data transmission, select the first path as a communication path from the first communication device to the second communication device before a TCP connection between the first communication device and the second communication device is established and the second path as a communication path from the first communication device to the second communication device after the TCP connection between the first communication device and the second communication device is established; and
when User Datagram Protocol (UDP) is determined to be used for data transmission, select the first path as a communication path from the first communication device to the second communication device and the second path as a communication path from the second communication device return to the first communication device.

2. The path control system according to claim 1, wherein the first communication device, the second communication device and the security device update a flow information management table when receiving a control instruction signal for the communication path of the data selected in the flow controller.

3. The path control system according to claim 1, wherein the at least one processor of the flow controller is further configured to execute the instructions to collect load information from the first and second communication devices and the security device and select a communication path of the data based on the load information.

4. The path control system according to claim 1 wherein the security feature includes at least one of a firewall feature, an antivirus feature, an Universal Resource Locator (URL) filtering feature and an Intrusion Prevention System (IPS) feature.

5. The path control system according to claim 1, wherein the attribute of the data includes at least one of source identification information set to the data and protocol information.

6. The path control system according to claim 1, wherein the at least one processor of the flow controller is further configured to execute the instructions to select a third path different from the first and second paths as a communication path of the data when determining that at least one of the first communication device, the second communication device and the security device is in a high load state.

7. The path control system according to claim 1, wherein the first communication device, the second communication device and the security device update a flow information management table when receiving a control instruction signal for the communication path of the data selected in the flow controller, and
wherein the flow controller collects load information from the first and second communication devices and the security device and selects a communication path of the data based on the load information.

8. The path control system according to claim 1, when UDP is used for data transmission, different paths are selected for an outward path and a return path, and when TCP is used for data transmission, different paths are selected before and after the TCP connection.

9. A control device comprising:
at least one memory storing instructions, and
at least one processor configured to execute the instructions to:
select one of a first path through a security device that provides a security feature to data transmitted and received between a first communication device and a second communication device and a second path not through the security device as a communication path of the data based on a path information table where an attribute of the data transmitted and received between the first communication device and the second communication device and a communication path between the first communication device and the second communication device are associated,
when Transport Control Protocol (TCP) is determined to be used for data transmission, select the first path as a communication path from the first communication device to the second communication device before a TCP connection between the first communication device and the second communication device is established and the second path as a communication path from the first communication device to the second communication device after the TCP connection between the first communication device and the second communication device is established, and
when User Datagram Protocol (UDP) is determined to be used for data transmission, select the first path as a communication path from the first communication device to the second communication device and the second path as a communication path from the second communication device return to the first communication device.

10. The control device according to claim 9,
wherein the first communication device, the second communication device and the security device update a flow information management table when receiving a control instruction signal for the communication path of the data selected.

11. The control device according to claim 9, wherein the at least one processor is configured to execute the instructions to:
collect load information from the first and second communication devices and the security device and selects a communication path of the data based on the load information.

12. A path control method comprising:
selecting one of a first path through a security device that provides a security feature to data transmitted and received between a first communication device and a second communication device and a second path not through the security device as a communication path of the data based on a path information table where an attribute of the data transmitted and received between the first communication device and the second communication device and a communication path between the first communication device and the second communication device are associated;
when Transport Control Protocol (TCP) is determined to be used for data transmission, selecting the first path as a communication path from the first communication device to the second communication device before a TCP connection between the first communication device and the second communication device is established and the second path as a communication path from the first communication device to the second communication device after the TCP connection between the first communication device and the second communication device is established, and
when User Datagram Protocol (UDP) is determined to be used for data transmission, selecting the first path as a communication path from the first communication device to the second communication device and the second path as a communication path from the second communication device return to the first communication device.

13. The path control method according to claim 12,
wherein the first communication device, the second communication device and the security device update a flow information management table when receiving a control instruction signal for the communication path of the data selected.

14. The path control method according to claim 12, further comprising of collecting load information from the first and second communication devices and the security device and selecting a communication path of the data based on the load information.

15. The path control method according to claim 12, further comprising of selecting a third path different from the first and second paths as a communication path of the data when determining that at least one of the first communication device, the second communication device and the security device is in a high load state.

* * * * *